(12) United States Patent
Hiller et al.

(10) Patent No.: US 12,030,677 B2
(45) Date of Patent: Jul. 9, 2024

(54) ANOMALY DETECTION VIA SELF-LIFTING DETECTOR ATTACHMENT MEMBER OF UNMANNED AERIAL DRONE

(71) Applicant: THE BOEING COMPANY, Chicago, IL (US)

(72) Inventors: Nathan D. Hiller, Irvine, CA (US); Daniel I. Newman, Ambler, PA (US); Raymundo B. Torrez, Carson, CA (US)

(73) Assignee: THE BOEING COMPANY, Arlington, VA (US)

( * ) Notice: Subject to any disclaimer, the term of this patent is extended or adjusted under 35 U.S.C. 154(b) by 0 days.

(21) Appl. No.: 17/814,915

(22) Filed: Jul. 26, 2022

(65) Prior Publication Data

US 2024/0034491 A1   Feb. 1, 2024

(51) Int. Cl.
| | | |
|---|---|---|
| *B64U 20/50* | (2023.01) | |
| *B64D 1/22* | (2006.01) | |
| *B64C 39/02* | (2023.01) | |
| *B64U 10/13* | (2023.01) | |
| *B64U 70/80* | (2023.01) | |

(52) U.S. Cl.
CPC ............... *B64U 20/50* (2023.01); *B64D 1/22* (2013.01); *B64C 39/024* (2013.01); *B64U 10/13* (2023.01); *B64U 70/80* (2023.01)

(58) Field of Classification Search
CPC ................................. B64U 20/50; B64D 1/22
See application file for complete search history.

(56) References Cited

U.S. PATENT DOCUMENTS

| | | | | |
|---|---|---|---|---|
| 3,917,196 A | * | 11/1975 | Pond ...................... | B64D 39/00 244/135 A |
| 6,966,525 B1 | * | 11/2005 | Schroeder .............. | B64D 39/00 244/135 A |
| 7,152,828 B1 | * | 12/2006 | Garcia, Jr. ............. | B64D 39/04 244/135 A |

(Continued)

FOREIGN PATENT DOCUMENTS

| | | |
|---|---|---|
| CN | 112722296 A | 4/2021 |
| RU | 171413 U1 | 5/2017 |
| WO | 2018086496 A1 | 5/2018 |

OTHER PUBLICATIONS

"AirBIRD & AirGRAD UAV Systems", Gem Systems, https://www.gemsys.ca/uav-systems/, printed Jul. 19, 2022, pp. 1-3.

(Continued)

*Primary Examiner* — Jessica B Wong
(74) *Attorney, Agent, or Firm* — Moore IP Law

(57) ABSTRACT

A system includes a detector attachment member and a communication system. The detector attachment member includes a first end configured to be coupled to an unmanned aerial vehicle; a second end configured to be coupled to a detector; and a body extending between the first end and the second end, the body of a length selected such that an interference of the unmanned aerial vehicle at the detector is less than an interference threshold. The detector attachment member also includes a lift system coupled to the body. The communication system is coupled to the detector attachment member and is configured to provide communication between the unmanned aerial vehicle and the detector.

20 Claims, 10 Drawing Sheets

(56) References Cited

U.S. PATENT DOCUMENTS

| | | | | |
|---|---|---|---|---|
| 8,061,647 | B1* | 11/2011 | Powell | B64B 1/40 |
| | | | | 244/30 |
| 10,473,794 | B2 | 11/2019 | Scott et al. | |
| 11,644,285 | B1* | 5/2023 | Pfluger | B64D 3/02 |
| | | | | 89/1.11 |
| 2013/0206915 | A1* | 8/2013 | Desaulniers | B64C 29/00 |
| | | | | 244/165 |
| 2015/0060606 | A1 | 12/2015 | Wang et al. | |
| 2017/0101177 | A1* | 4/2017 | Smirnov | B64D 1/22 |
| 2017/0320592 | A1* | 11/2017 | Chen | B64F 1/04 |
| 2017/0359943 | A1* | 12/2017 | Calleija | A62C 37/40 |
| 2019/0276140 | A1* | 9/2019 | Poltorak | B64C 39/024 |
| 2020/0002015 | A1* | 1/2020 | Hiller | B64U 10/80 |
| 2020/0324893 | A1* | 10/2020 | Mills | B64C 37/02 |
| 2021/0147080 | A1* | 5/2021 | Crowley | B64D 1/22 |
| 2022/0258875 | A1* | 8/2022 | Kyono | G06V 20/56 |
| 2023/0125625 | A1* | 4/2023 | Dockray | B63H 7/02 |
| | | | | 440/37 |

OTHER PUBLICATIONS

"MAD-XR", CAE, https://www.cae.com/media/documents/DM044_MAD-XR-_EN_Feb2020.pdf, printed Jul. 19, 2022, pp. 1-2.

"MagArrow UAV-Enabled Magnetometer", Geometrics, https://www.geometrics.com/product/magarrow/, printed Jul. 19, 2022, pp. 1-4.

"MagDrone R3", Sensys Magnatemeters & Survey Solutions, https://sensysmagnetometer.com/products/magdrone-3/, printed Jul. 19, 2022, pp. 1-5.

"Unmanned Aerial Vehicle (UAV) Based Magnetic Anomaly Detection (MAD) for Small Submarine Hunting in Shallow Water and Over-the-land Reconnaissance", SBIR STTR, https://www.sbir.gov/sbirsearch/detail/333922, printed Jul. 19, 2022, pp. 1-2.

John Keller, "UNMANNED Industry asked to develop magnetic anomaly detector (MAD)-equipped UAV for anti-submarine warfare (ASW)", Military+Aerospace Electronics, https://www.militaryaerospace.com/unmanned/article/14034795/antisubmarine-warfare-asw-uav-magnetic-anomaly-detector-mad, printed Jul. 19, 2022, pp. 1-3.

Extended European Search Report for application No. 23180246.3 dated Dec. 14, 2023, 13 pages.

* cited by examiner

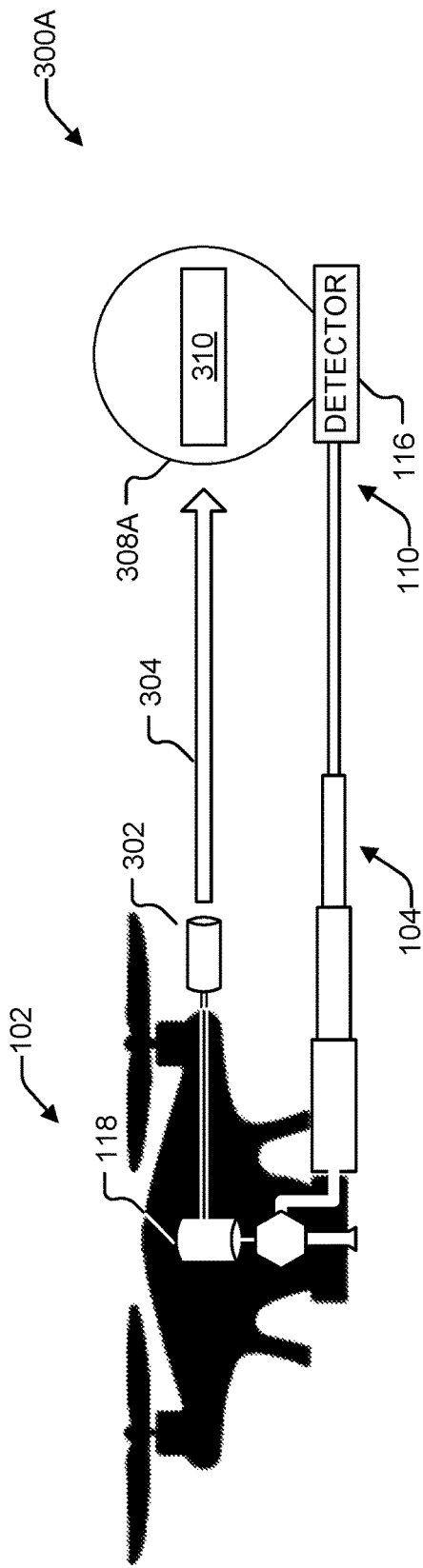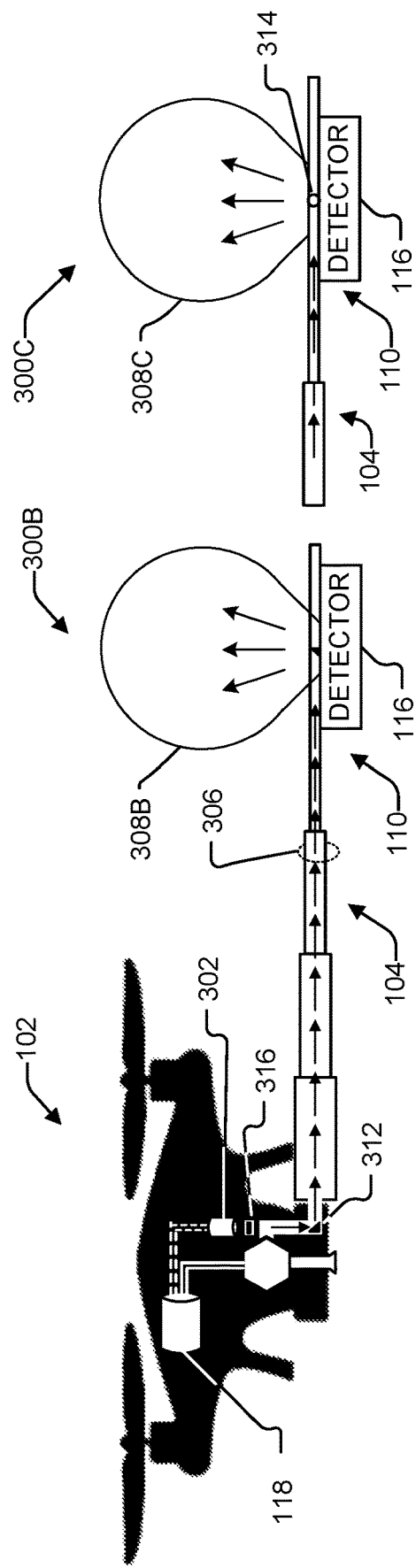

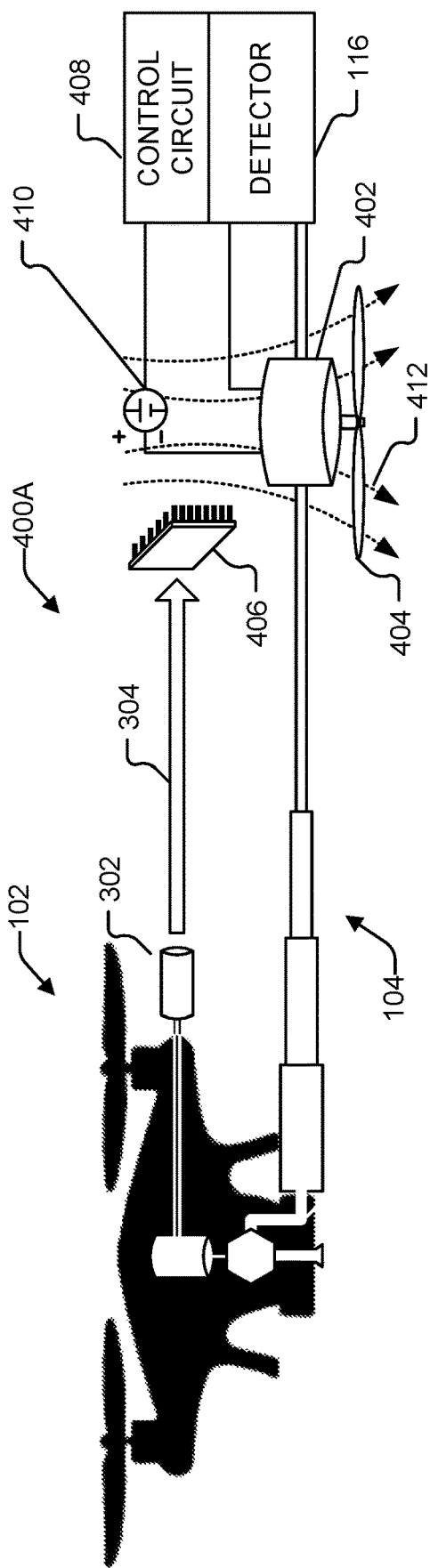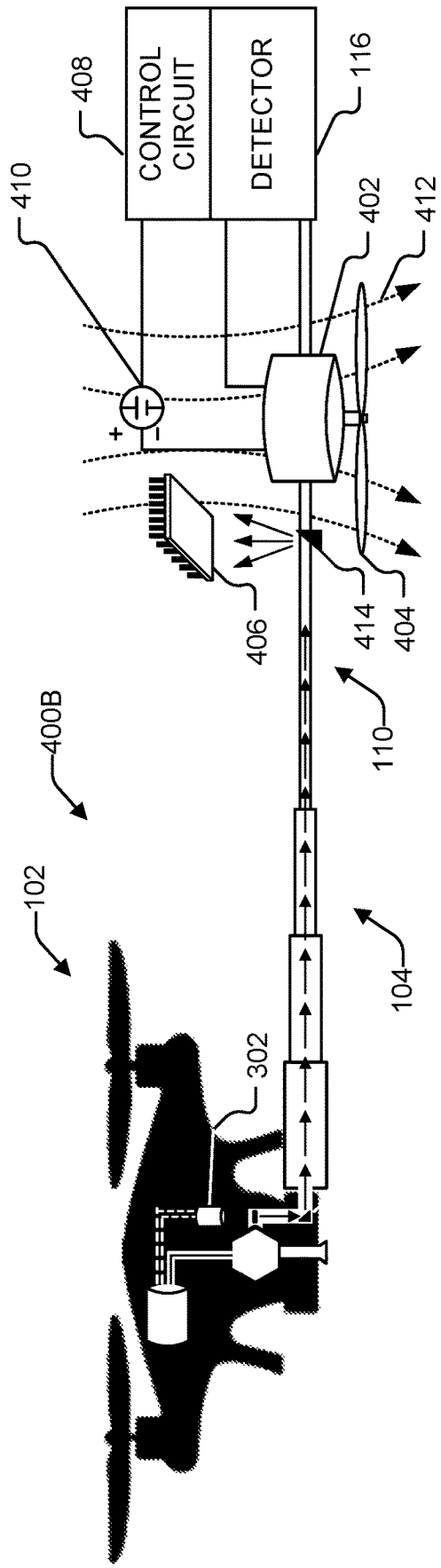
FIG. 4A
FIG. 4B

900

902
DEPLOYING A DETECTOR ATTACHMENT MEMBER, THE DETECTOR ATTACHMENT MEMBER INCLUDING: A FIRST END CONFIGURED TO BE COUPLED TO AN UNMANNED AERIAL VEHICLE; A SECOND END CONFIGURED TO BE COUPLED TO A DETECTOR; A BODY EXTENDING BETWEEN THE FIRST END AND THE SECOND END, THE BODY OF A LENGTH SELECTED SUCH THAT AN INTERFERENCE OF THE UNMANNED AERIAL VEHICLE AT THE DETECTOR IS LESS THAN AN INTERFERENCE THRESHOLD. THE DETECTOR ATTACHMENT MEMBER ALSO INCLUDES A LIFT SYSTEM COUPLED TO THE BODY

904
COMMUNICATIVELY COUPLING A COMMUNICATION SYSTEM TO THE UNMANNED AERIAL VEHICLE AND THE DETECTOR, THE COMMUNICATION SYSTEM COUPLED TO THE DETECTOR ATTACHMENT MEMBER

FIG. 9

ANOMALY DETECTION VIA SELF-LIFTING DETECTOR ATTACHMENT MEMBER OF UNMANNED AERIAL DRONE

FIELD OF THE DISCLOSURE

The subject disclosure is generally related to anomaly detection via unmanned aerial vehicle.

BACKGROUND

In some inhospitable environments, such as deep ocean, dense jungle, etc., it can be difficult, if not impossible, for personnel-based observation and detection systems to operate. Additionally, certain automated or semi-automated observation and detection systems can lack the capability, sufficient detection sensitivity, effective observation range, or some combination thereof to effectively operate in such environments.

For example, certain security systems tasked with locating and/or tracking submarines in the ocean have limitations either in searching a wide enough area with the system's detection sensitivity, or, inversely, searching with sufficient sensitivity to identify the submarine when searching a wide area. As an additional example, certain security systems tasked with identifying and/or locating materiel (e.g., abandoned land mines, unexploded ordinance, etc.) in dense jungle can lack the capability to operate in such an environment.

SUMMARY

In a particular implementation, a system includes a detector attachment member and a communication system coupled to the detector attachment member. The detector attachment member includes a first end configured to be coupled to an unmanned aerial vehicle; a second end configured to be coupled to a detector; a body extending between the first end and the second end, the body of a length selected such that an interference of the unmanned aerial vehicle at the detector is less than an interference threshold; and a lift system coupled to the body. The communication system is configured to provide communication between the unmanned aerial vehicle and the detector.

In another particular implementation, a method includes deploying a detector attachment member. The detector attachment member includes a first end configured to be coupled to an unmanned aerial vehicle; a second end configured to be coupled to a detector; a body extending between the first end and the second end, the body of a length selected such that an interference of the unmanned aerial vehicle at the detector is less than an interference threshold; and a lift system coupled to the body. The method also includes communicatively coupling a communication system to the unmanned aerial vehicle and the detector, wherein the communication system is coupled to the detector attachment member.

In another particular implementation, a non-transient, computer-readable medium storing instructions executable by one or more processors to perform certain operations. The operations include deploying a detector attachment member. The detector attachment member includes a first end configured to be coupled to an unmanned aerial vehicle; a second end configured to be coupled to a detector; a body extending between the first end and the second end, the body of a length selected such that an interference of the unmanned aerial vehicle at the detector is less than an interference threshold; and a lift system coupled to the body. The operations also include communicatively coupling a communication system to the unmanned aerial vehicle and the detector, the communication system coupled to the detector attachment member.

In another particular implementation, a device includes means for deploying a detector attachment member, the detector attachment member. The detector attachment member includes a first end configured to be coupled to an unmanned aerial vehicle; a second end configured to be coupled to a detector; a body extending between the first end and the second end, the body of a length selected such that an interference of the unmanned aerial vehicle at the detector is less than an interference threshold; and a lift system coupled to the body. The device also includes means for communicatively coupling a communication system to the unmanned aerial vehicle and the detector, the communication system coupled to the detector attachment member.

The features, functions, and advantages described herein can be achieved independently in various implementations or can be combined in yet other implementations, further details of which can be found with reference to the following description and drawings.

BRIEF DESCRIPTION OF THE DRAWINGS

FIG. 3A illustrates another example system for anomaly detection via unmanned aerial vehicle, in accordance with at least one implementation of the subject disclosure.

FIG. 3B illustrates another example system for anomaly detection via unmanned aerial vehicle, in accordance with at least one implementation of the subject disclosure.

FIG. 3C illustrates another example system for anomaly detection via unmanned aerial vehicle, in accordance with at least one implementation of the subject disclosure.

FIG. 4A illustrates another example system for anomaly detection via unmanned aerial vehicle, in accordance with at least one implementation of the subject disclosure.

FIG. 4B illustrates another example system for anomaly detection via unmanned aerial vehicle, in accordance with at least one implementation of the subject disclosure.

FIG. 9 is a flow chart of an example of a method for enabling anomaly detection via unmanned aerial vehicle, in accordance with at least one implementation of the subject disclosure.

DETAILED DESCRIPTION

Aspects disclosed herein use a system for anomaly detection via unmanned aerial vehicle to improve observation and detection systems and methods, particularly by providing a way to improve the operational capability, detection sensitivity, and/or effective observation range of certain observation and detection systems by providing accurate anomaly detection implemented via unmanned aerial vehicle. There are difficulties in using unmanned aerial vehicles for anomaly detection, particularly in deploying an anomaly detector in such a manner as to minimize the effect of the unmanned aerial vehicle itself on the operation of the anomaly detector. For example, a magnetic anomaly detector deployed to identify anomalies in the Earth's magnetic field will not operate with sufficient accuracy if deployed such that the unmanned aerial vehicle's own magnetic field interferes with the magnetic anomaly detector. Likewise, an acoustic detector deployed to identify sound-related anomalies will not operate with sufficient accuracy if the unmanned aerial vehicle's own acoustic signature interferes with the acoustic detector.

One way to perform anomaly detection via an unmanned aerial vehicle is to deploy a detector attachment member coupled to the unmanned aerial vehicle, where the detector attachment member has a length such that the interference of the unmanned aerial vehicle at the detector is less than an interference threshold of the detector. The system or method of anomaly detection can also include a communication system that provides for communication of detector data between the detector and the unmanned aerial vehicle. The detector, the detector attachment member, the communication system, and any additional components coupled to the unmanned aerial vehicle for anomaly detection can be selected such that the overall weight of the coupled components does not adversely affect the performance of the unmanned aerial vehicle.

The figures and the following description illustrate specific exemplary embodiments. It will be appreciated that those skilled in the art will be able to devise various arrangements that, although not explicitly described or shown herein, embody the principles described herein and are included within the scope of the claims that follow this description. Furthermore, any examples described herein are intended to aid in understanding the principles of the disclosure and are to be construed as being without limitation. As a result, this disclosure is not limited to the specific embodiments or examples described below, but by the claims and their equivalents.

Figure 8:
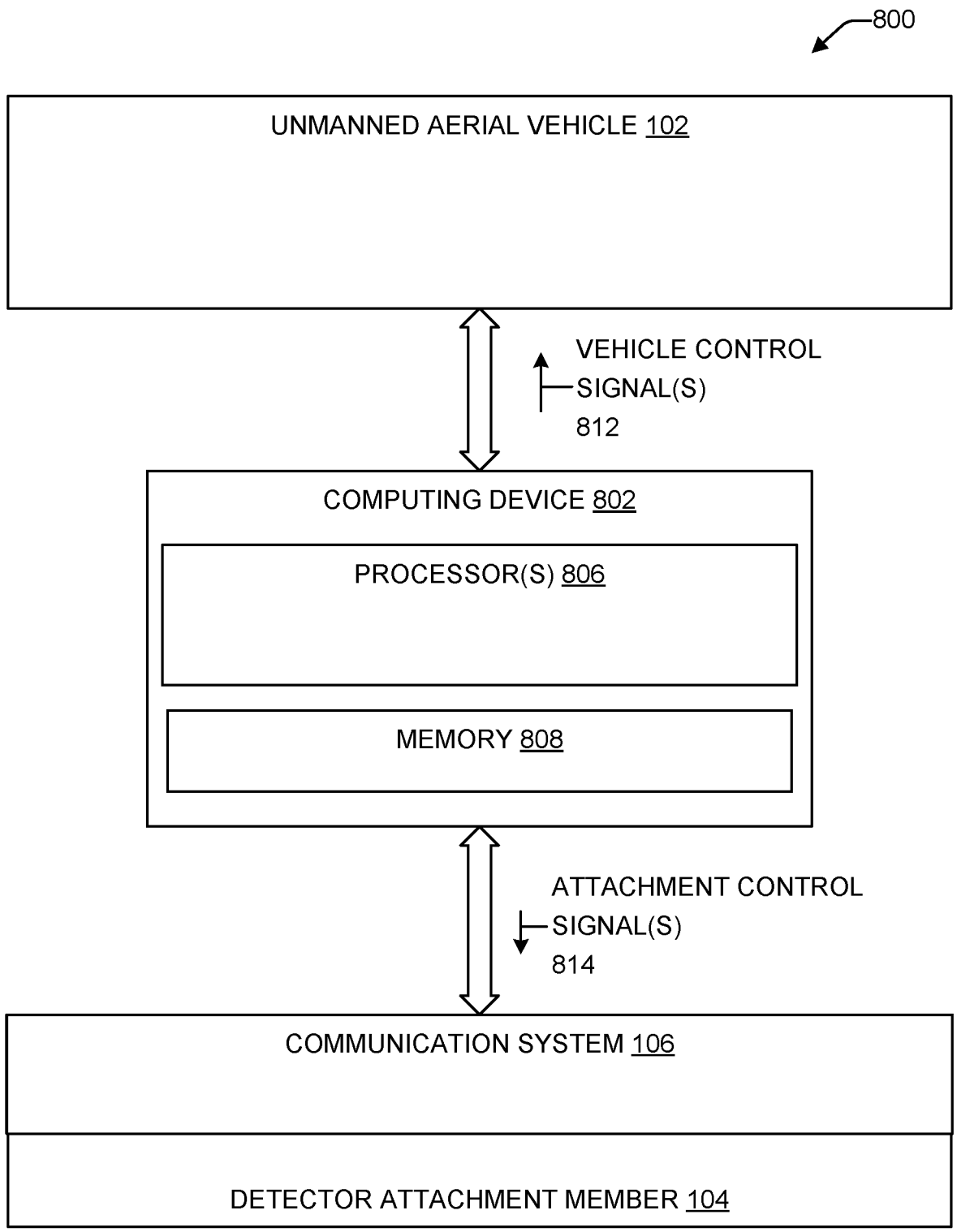
FIG. 8 depicts another example system for anomaly detection via unmanned aerial vehicle, in accordance with at least one implementation of the subject disclosure.

Particular implementations are described herein with reference to the drawings. In the description, common features are designated by common reference numbers throughout the drawings. As used herein, various terminology is used for the purpose of describing particular implementations only and is not intended to be limiting. For example, the singular forms "a," "an," and "the" are intended to include the plural forms as well, unless the context clearly indicates otherwise. Further, some features described herein are singular in some implementations and plural in other implementations. To illustrate, FIG. 8 depicts a system 800 including one or more processors ("processor(s)" 806 in FIG. 1), which indicates that in some implementations the system 800 includes a single processor 806 and in other implementations the system 800 includes multiple processors 806. For ease of reference herein, such features are generally introduced as "one or more" features and are subsequently referred to in the singular unless aspects related to multiple of the features are being described.

In some drawings, multiple instances of a particular type of feature are used. Although these features are physically and/or logically distinct, the same reference number is used for each, and the different instances are distinguished by addition of a letter to the reference number. When the features as a group or a type are referred to herein (e.g., when no particular one of the features is being referenced), the reference number is used without a distinguishing letter. However, when one particular feature of multiple features of the same type is referred to herein, the reference number is used with the distinguishing letter. For example, referring to FIGS. 2A-2B, multiple positions for a detector attachment member are illustrated and associated with reference numbers 202A and 202B. When referring to a particular one of these positions, such as the first position 202A, the distinguishing letter "A" is used. However, when referring to any arbitrary one of these positions or these positions as a group, the reference number 202 can be used without a distinguishing letter.

The terms "comprise," "comprises," and "comprising" are used interchangeably with "include," "includes," or "including." Additionally, the term "wherein" is used interchangeably with the term "where." As used herein, "exemplary" indicates an example, an implementation, and/or an aspect, and should not be construed as limiting or as indicating a preference or a preferred implementation. As used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). As used herein, the term "set" refers to a grouping of one or more elements, and the term "plurality" refers to multiple elements.

As used herein, "generating," "calculating," "using," "selecting," "accessing," and "determining" are interchangeable unless context indicates otherwise. For example, "generating," "calculating," or "determining" a parameter (or a signal) can refer to actively generating, calculating, or determining the parameter (or the signal) or can refer to using, selecting, or accessing the parameter (or signal) that is already generated, such as by another component or device. As used herein, "coupled" can include "communicatively coupled," "electrically coupled," or "physically coupled," and can also (or alternatively) include any combinations thereof. Two devices (or components) can be coupled (e.g., communicatively coupled, electrically coupled, or physically coupled) directly or indirectly via one or more other devices, components, wires, buses, networks (e.g., a wired network, a wireless network, or a combination thereof), etc. Two devices (or components) that are electrically coupled can be included in the same device or in different devices and can be connected via electronics, one or more connectors, or inductive coupling, as illustrative, non-limiting examples. In some implementations, two devices (or components) that are communicatively coupled, such as in electrical communication, can send and receive electrical signals (digital signals or analog signals) directly or indirectly, such as via one or more wires, buses, networks, etc. As used herein, "directly coupled" is used to describe two devices that are coupled (e.g., communicatively coupled, electrically coupled, or physically coupled) without intervening components.

Figure 1:
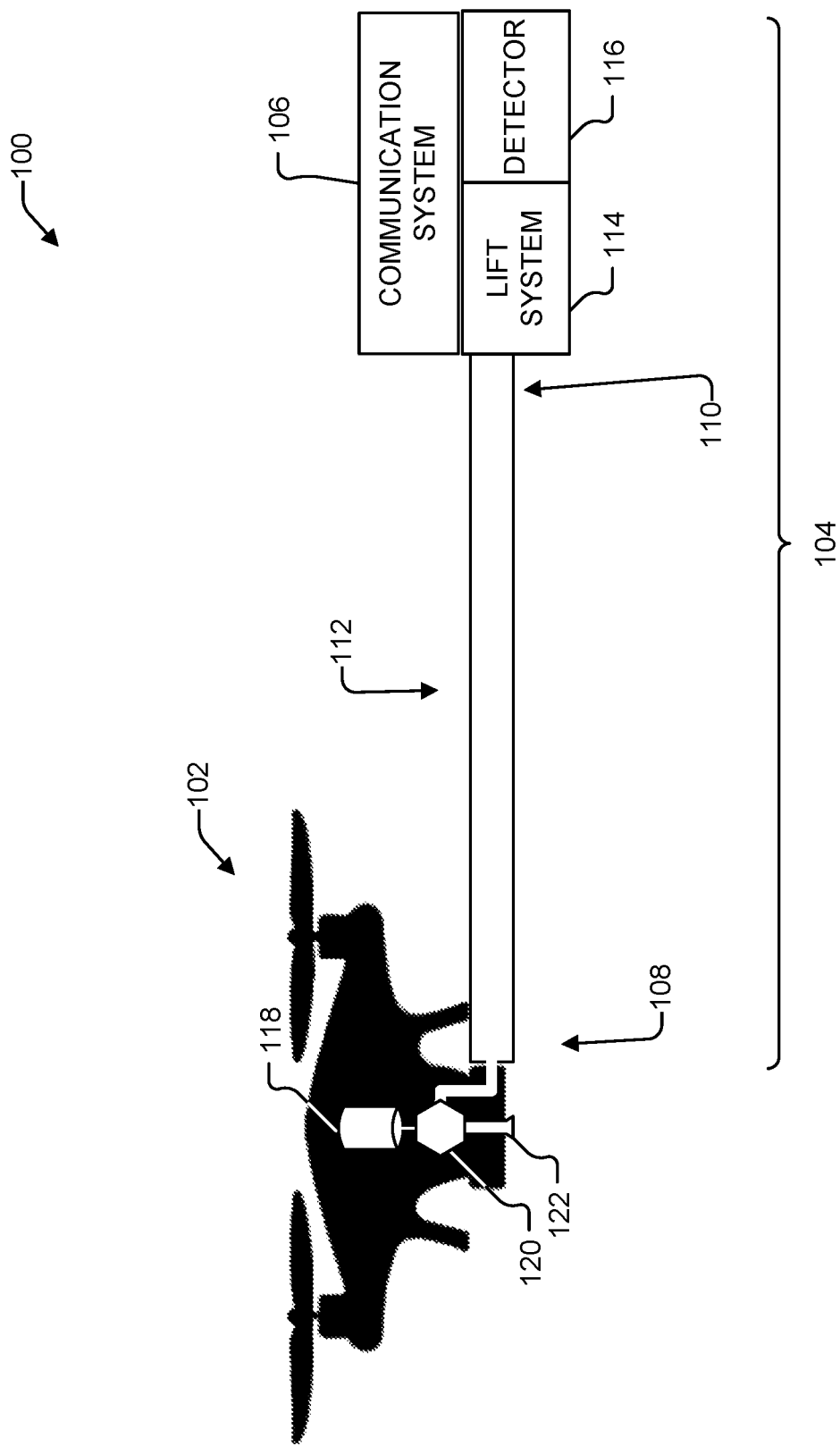
FIG. 1 depicts an example system for anomaly detection via unmanned aerial vehicle, in accordance with at least one implementation of the subject disclosure.

FIG. 1 depicts an example system 100 for anomaly detection via unmanned aerial vehicle, in accordance with at least one implementation of the subject disclosure. In some implementations, the system 100 includes a detector attachment member 104 coupled to an unmanned aerial vehicle 102 at a first end 108 and coupled to a communication system 106 at a second end 110. The detector attachment member 104 also has a body 112 extending between the first end 108 and the second end 110. The body 112 can be formed of any appropriate lightweight material. For example, the body 112 can be formed of carbon fiber. The body 112 is of a length selected such that an interference of the unmanned aerial vehicle 102 at the detector 116 is less than an interference threshold.

The detector 116 can be, for example, a magnetic anomaly detector, an acoustic detector, a radiation detector, etc. In some aspects, the interference threshold can be based on a detection limit of the detector 116. For example, if the detector 116 is a magnetic anomaly detector, a detector 116 configured to detect a magnetic anomaly from a height of twenty meters above the ground can be configured to detect the magnetic anomaly if the interference from the unmanned aerial vehicle is less than or equal to the geomagnetic field as background noise. In order to ensure that the interference from the unmanned aerial vehicle is less than the appropriate interference threshold, the magnetic anomaly detector can be positioned at a point a distance (e.g., five meters) away from the unmanned aerial vehicle.

As noted above, the overall weight of the magnetic anomaly detection components should not adversely affect the performance of the unmanned aerial vehicle. One aspect of this is ensuring that placing a weight (e.g., of the detector 116) at a distance (e.g., the length of the body 112 of the detector attachment member 104) from the unmanned aerial vehicle 102 does not cause sufficient torque on the unmanned aerial vehicle 102 as to adversely impact the performance of the unmanned aerial vehicle 102. For example, an illustrative detector 116 can be a magnetic anomaly detector approximately fifteen by twenty-four centimeters in size and weighing approximately three-and-a-half pounds. Placing such a weight five meters from the unmanned aerial vehicle 102 can result in an axial force on the unmanned aerial vehicle 102 that could cause the unmanned aerial vehicle 102 to flip or otherwise be unable to perform normal flight operations.

To counter the axial force of the detector 116 at a length from the unmanned aerial vehicle 102, the detector attachment member 104 can also include a lift system 114 coupled to the body 112. The lift system 114 can be configured to, among other things, provide a lift force proximate the detector 116 to counteract downward force of the detector 116 on the unmanned aerial vehicle 102. In some aspects, the lift system 114 can include an air pump 120 configured to receive environmental gases via an air inlet 122 and pump the environmental gases to one or more other components of the lift system 114 at such a rate and in such quantity as to allow remaining components of the lift system 114 to provide an appropriate lift force. For example, the lift system 114 can include one or more additional components such as an air outlet (e.g., a nozzle) to direct the received environmental gases downward to provide an appropriate lift force. In a particular aspect, the body 112 of the detector attachment member 104 can be hollow. In such an aspect, the air pump 120 can be configured to pump the received environmental gases through the body 112 of the detector attachment member 104 for discharge via an air outlet or other appropriate component of the lift system 114. In another particular aspect, the system 100 can include tubing or other conduit running alongside the detector attachment member 104 (and potentially coupled to the detector attachment member 104) and configured to provide the received environmental gases to an air outlet or other appropriate component of the lift system 114.

In some implementations, the system 100 can also include a power supply 118. The power supply 118 can be configured to, among other things, provide power to the air pump 120 and/or one or more other components of the system 100. For example, the power supply 118 can be configured to provide power to one or more components of the communication system 106, as described in more detail below with reference to FIGS. 3A-3C, FIGS. 4A-4B, and FIG. 7. In the same or alternative implementations, the power supply 118 can be configured to provide power to one or more components of the unmanned aerial vehicle 102.

In some implementations, the system 100 can be configured to provide real-time or near real-time feedback to other components of an overall observation and detection system. This feedback can allow, for example, the observation and detection system to modify a flight path of the unmanned aerial vehicle 102 to search for magnetic anomalies in a new location. In some aspects, providing this real-time or near real-time feedback can include processing data from the detector 116 to determine whether the detector 116 has found an indication of a magnetic anomaly at a current time and location. The analysis of data from the detector 116 can be done in a variety of processes, but these processes can require computing resources. Such computing resources have accompanying weight factors that can adversely affect the performance of the system 100. Likewise, any communication system configured to communicate the data from the detector 116 to another component of the observation and detection system can have a weight factor that can adversely affect the performance of the system 100. In order to address such concerns, as well as for other reasons, it can be beneficial to include in the system 100 a relatively small, relatively light-weight communication system. Such a communication system can have a relatively short effective communication range. One way of balancing the weight and effectiveness concerns in implementing a communication system in the system 100 is to provide the communication system 106, configured to provide communication between the detector 116 and the unmanned aerial vehicle 102.

In a particular aspect, the system 100 can include a communication system 106 coupled to the detector attachment member 104 and communicatively coupled to the unmanned aerial vehicle 102. The communication system 106 can include a number of components selected to communicate data from the detector 116 to the unmanned aerial vehicle 102, as described in more detail below with reference to FIG. 7. Generally, the components of the communication system 106 can be chosen to provide communication (e.g., via a laser, acoustic, or radio frequency ("RF") communication scheme) of a relatively small amount of data (e.g., the magnetic anomaly readings from the detector 116 for a particular period of time) over the relatively short distance (e.g., five meters) between the detector 116 and the unmanned aerial vehicle 102.

In some aspects, the components of the communication system 106 can be selected to minimize the weight impact of the communication system 106 on the performance of the unmanned aerial vehicle 102. For example, the communication system 106 can be selected such that its total weight, when coupled to the detector attachment member 104, does not adversely affect the performance of the unmanned aerial vehicle when the lift system 114 is operating.

The unmanned aerial vehicle 102 can be configured to receive data from the detector 116 via the communication system 106. In some implementations, the unmanned aerial vehicle 102 can also be configured to store and/or transmit the data to one or more other components of an observation and detection system. For example, if real-time or near real-time data updates are not needed for a particular operation, the unmanned aerial vehicle 102 can be configured to store the data from the detector 116 for later retrieval and analysis. This can unburden the anomaly detection system 100 from the need of adding the weight of data storage components at the second end 110 of the detector attachment member 104. As an additional example, if real-time or near real-time data updates are needed for a particular operation, the unmanned aerial vehicle 102 can be configured to transmit some or all of the data from the detector 116 to one or more other components of an observation and detection system (e.g., a nearby monitoring station that can be ground-based, sea-based, and/or air-based such as a drone described in U.S. patent application Ser. No. 15/930,668 (U.S. Pat. App. Pub. No. 2021/035482) and/or U.S. Pat. No. 11,165, 506, the contents of which are both hereby incorporated by reference). In yet another example, the unmanned aerial vehicle 102 can be configured to include one or more components configured to process the data from the detector 116. This processing can include processing for transmission (e.g., bundling data readings from the detector 116 into a single transmission), processing for analysis (e.g., processing related to interpreting the magnetic field readings from a magnetic anomaly detector), and/or some combination thereof.

In some aspects, some or all of the components of the communication system 106 can be powered by the power supply 118. In the same or alternative aspects, some or all of the components of the communication system 106 can be powered by other power supplies located elsewhere in the system 100. For example, a transmitter proximate the second end 110 of the detector attachment member 104 can be configured to receive power from a power supply also proximate the second end 110.

In some implementations, the detector attachment member 104 can be coupled to the unmanned aerial vehicle 102 proximate the first end 108 of the detector attachment member 104. The coupling can be fixed or mobile. A mobile coupling can include one or more components that allows the detector attachment member 104 to move relative to the unmanned aerial vehicle 102. This movement can include lateral movement relative to the unmanned aerial vehicle 102 (e.g., as described in more detail below with reference to FIGS. 2A-2B), and/or movement in one or more rotational axes relative to the unmanned aerial vehicle 102. For example, the detector attachment member 104 can be configured to be rotationally coupled to the unmanned aerial vehicle 102. Such a rotational coupling can allow the detector attachment member 104 to sweep around the unmanned aerial vehicle 102, move from a position where the body 112 extends from the unmanned aerial vehicle 102 in a first plane (e.g., extended from the unmanned aerial vehicle 102 as illustrated in FIG. 1) to a second plane (e.g., below the unmanned aerial vehicle 102).

In the same or alternative implementations, the body 112 of the detector attachment member 104 can be a continuous member that can be solid, hollow, or some combination thereof. In other configurations, the body 112 of the detector attachment member 104 can be a telescoping member configured to extend from a first position to a second position, where the length of the body of the detector attachment member— selected such that an interference of the unmanned aerial vehicle at the detector is less than an interference threshold—is the length of the body in the second position, as described in more detail below with reference to FIGS. 2A-2B. In such configurations, the detector attachment member 104 can also be solid, hollow, or some combination thereof.

Figure 2A:
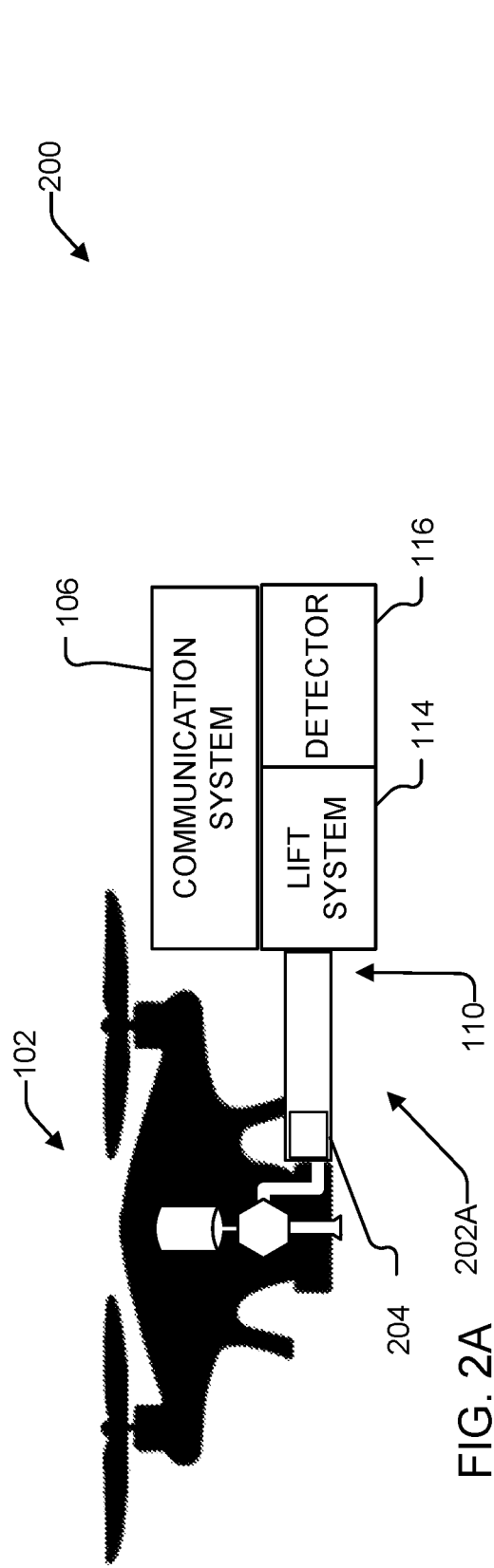
FIG. 2A illustrates another example system for anomaly detection via unmanned aerial vehicle, in accordance with at least one implementation of the subject disclosure.

FIG. 2A illustrates another example system 200 for anomaly detection via unmanned aerial vehicle, in accordance with at least one implementation of the subject disclosure. FIG. 2A illustrates a system 200 including a detector attachment member that is a telescoping member configured to extend from a first position to a second position. The system 200 includes a detector attachment member (e.g., the detector attachment member 104 of FIG. 1) in the first position 202A. As illustrated in FIG. 2A, the communication system 106, lift system 114, and detector 116 of FIG. 1 proximate the second end 110 of the detector attachment member in the first position 202A are relatively close to the unmanned aerial vehicle 102 of FIG. 1. In some aspects, the system 200 can also include an extension system 204 coupled to the detector attachment member 104. The extension system 204 can include, among other components, a motor or other appropriate mechanical and/or electromechanical device configured to extend the detector attachment member 104 from the first position 202A to one or more additional positions, as described in more detail below with reference to FIG. 2B.

As described in more detail above with reference to FIG. 1, the body of the detector attachment member can be selected to ensure that interference from the unmanned aerial vehicle 102 does not substantially interfere with the operation of the detector 116. In position 202A, the detector attachment member can have a length that is not so selected. In position 202A, if the detector 116 were operational, the unmanned aerial vehicle 102 may interfere with the appropriate operation of the detector 116. However, the detector attachment member in the position 202A can be beneficial for, for example, storage of the system 200, flight of the unmanned aerial vehicle 102 before and after the operation of the detector 116, etc. In certain aspects, the detector attachment member may only be extended to its full length for some or all of the operation of the detector 116 rather than the full flight of the unmanned aerial vehicle 102.

Figure 2B:
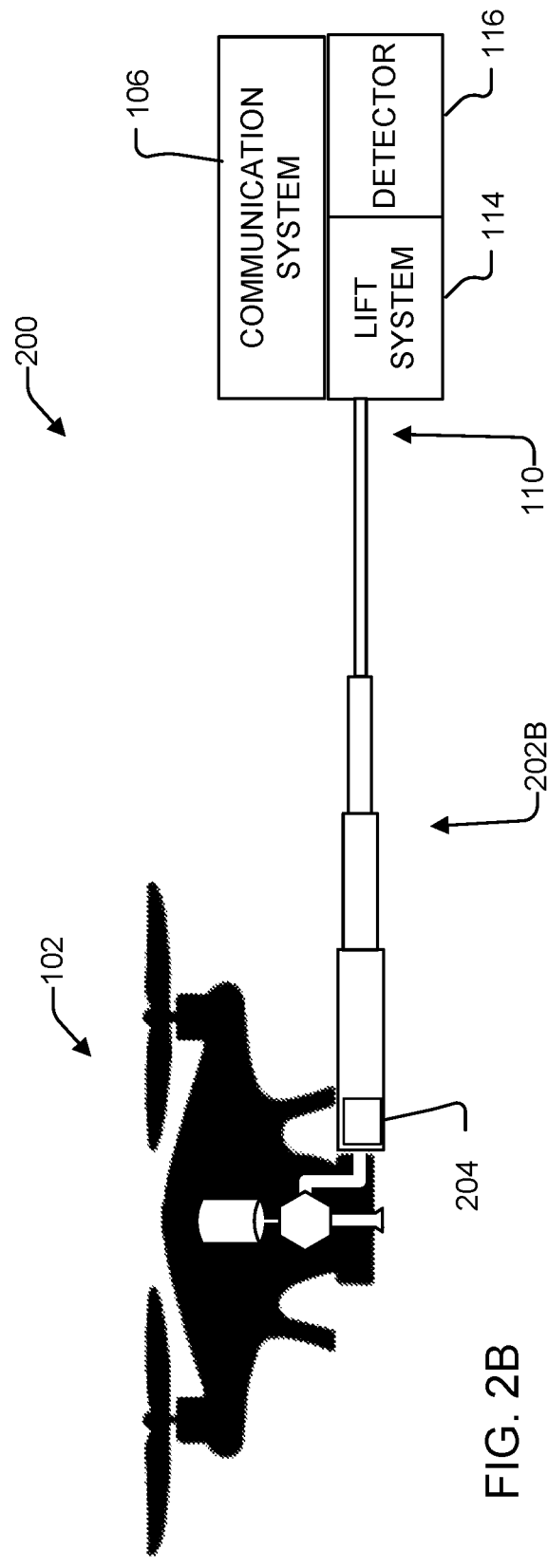
FIG. 2B illustrates another aspect of the example system of FIG. 2A for anomaly detection via unmanned aerial vehicle, in accordance with at least one implementation of the subject disclosure.

FIG. 2B illustrates another aspect of the example system 200 of FIG. 2A for anomaly detection via unmanned aerial vehicle, in accordance with at least one implementation of the subject disclosure. FIG. 2B illustrates a system 200 including a detector attachment member that is a telescoping member configured to extend from a first position to a second position. The system 200 includes a detector attachment member (e.g., the detector attachment member 104 of FIG. 1) in the second position 202B. As illustrated in FIG. 2B, the communication system 106, lift system 114, and detector 116 of FIG. 1 proximate the second end 110 of the detector attachment member in the first position 202B are relatively far from the unmanned aerial vehicle 102 of FIG. 1. In some implementations, the system 200 can also include an extension system 204 coupled to the detector attachment member 104. The extension system 204 can include, among other components, a motor or other appropriate mechanical and/or electromechanical device configured to extend the detector attachment member 104 from the first position 202A of FIG. 2A the second position 202B. In some aspects, the extension system 204 can be configured to extend the detector attachment member 104 of FIG. 1 from the first position 202A to the second position 202B in response to a control command. The control command can be received and/or generated by one or more components of the unmanned aerial vehicle 102, the communication system 106, the detector attachment member 104, and/or some combination thereof, as described in more detail below with reference to FIG. 8.

As described in more detail above with reference to FIG. 1, the body of the detector attachment member can be selected to ensure that interference from the unmanned aerial vehicle 102 does not substantially interfere with the operation of the detector 116. In position 202B, the detector attachment member can be configured to have such a length. In position 202B, the detector 116 can be operational without concern that the interference from the unmanned aerial vehicle 102 will rise above the interference threshold of the detector 116.

Although FIGS. 2A-2B illustrate the detector attachment member as extending from a first position 202A to a second position 202B, the detector attachment member can be configured to extend to more or different positions than those illustrated in FIGS. 2A-2B. For example, the detector attachment member 104 can be configured to extend to multiple positions from the unmanned aerial vehicle, wherein each position is chosen based on a particular interference threshold. If the magnetic anomaly detection system included multiple detectors 116, for example, each detector 116 can have a particular associated interference threshold. As a result, the detector attachment member 104 can be configured to extend to multiple positions, with each position associated with a respective one of the interference thresholds. As an additional example, the detector attachment member can be configured to have a first position (e.g., the first position 202A) for storage of the anomaly detection system 200 in which all components of the system 200 are optimally compact, a second position in which the communication system 106, the lift system 114, and the detector 116 are extended from the unmanned aerial vehicle such that they do not impede the flight of the unmanned aerial vehicle 102 but do not allow for full operation of the detector 116, and a third position wherein the detector attachment member is extended to its full length.

Referring again to FIG. 1, the anomaly detection system 100 can include a lift system 114 coupled to the body 112 of the detector attachment member 104. Myriad ways of providing lift to the system 100 without adversely impacting the performance of the unmanned aerial vehicle 102 can be incorporated into the system 100 without departing from the scope of the present disclosure. The lift system 114 can include, for example, an air inlet/outlet system as described in more detail above, an inflatable member as described in more detail below with reference to FIGS. 3A-3C, a propulsion system as described in more detail below with reference to FIGS. 4-5, other appropriate components of the lift system 114, and/or some combination thereof.

FIG. 3A illustrates another example system 300A for anomaly detection via unmanned aerial vehicle, in accordance with at least one implementation of the subject disclosure. FIG. 3A illustrates a system 300A wherein the lift system 114 of FIG. 1 includes an inflatable member 308A proximate the second end 110 of the detector attachment member 104. The inflatable member 308A can be configured to generate lift via buoyancy relative to an operating environment of the unmanned aerial vehicle 102.

In some implementations, the inflatable member 308A can include a light-absorbing region 310 configured to heat a gas within the inflatable member 308 when exposed to a focused light beam. Once heated, the gas within the inflatable member 308 will expand, providing at least a portion of the lift proximate the second end of the detector 116 and the detector attachment member 104 of FIG. 1. In some aspects, the focused light beam can be generated by one or more lasers 302 configured to provide a free space laser beam 304 to the light-absorbing region 310 of the inflatable member 308A. In a particular aspect, the laser 302 can be powered by the power supply 118 of FIG. 1. In the same or alternative aspects, the laser 302 can be powered by other components of the system 300A, such as one or more components of the unmanned aerial vehicle 102. In further the same or alternative aspects, at least one laser 302 can be configured to provide a focused light beam with a wavelength of approximately 532 nm.

Although the system 300A illustrates certain components of an exemplary lift system 114 of FIG. 1, more, fewer, and/or different components of the lift system 114 can be present without departing from the scope of the subject disclosure. For example, the system 300A can include a control circuit coupled to the laser 302 configured to, for example, control the operation of the laser 302, including power, transmission, and/or orientation control.

FIG. 3B illustrates another example system 300B for anomaly detection via unmanned aerial vehicle, in accordance with at least one implementation of the subject disclosure. FIG. 3B illustrates a system 300B wherein the lift system 114 of FIG. 1 includes an inflatable member 308B proximate the second end 110 of the detector attachment member 104. The inflatable member 308B can be configured to generate lift via buoyancy relative to an operating environment of the unmanned aerial vehicle 102.

In some implementations, the detector attachment member 104 has a body that is substantially hollow, as described in more detail above with reference to FIG. 1. In some aspects, the laser 302 can be configured to generate a focused light beam through an antireflective optical window 316, into the substantially hollow body of the detector attachment member 104. The focused light beam from the laser 302 can be manipulated in various ways. In a particular aspect, the focused light beam from the laser changes direction via an encounter with a mirror or a beam splitter 312 positioned within the body of the detector attachment member 104. The beam splitter 312 can be configured to, among other things, redirect the focused light beam down the length of the detector attachment member 104 through the interior of the body.

In some aspects, the focused light beam can be further manipulated within the body of the detector attachment member 104. In a particular aspect, a waveguide 306 can be positioned proximate the body of the detector attachment member 104 in order to ensure a focused light beam of sufficient intensity arrives at the inflatable member 308B. For example, the waveguide 306 can be a hollow mirror waveguide configured to further focus the focused light beam from the laser 302 to ensure the focused light beam arrives in the appropriate location and at appropriate intensity at the second end of the detector attachment member 104.

In some implementations, the inflatable member 308B can include a light-absorbing region within the inflatable member 308B. For example, some or all of the inner portion of the inflatable member 308B (e.g., some or all of the portion of the inflatable member 308B not exposed to full environmental conditions) can be formed of a light-absorbing material that can expand when exposed to light. Thus, when the focused light beam from the laser 302 arrives at the inflatable member 308B via the detector attachment member 104, the inflatable member 308B can be configured to expand, providing at least a portion of the lift proximate the detector 116 coupled to the detector attachment member 104.

Although the system 300B illustrates certain components of an exemplary lift system 114 of FIG. 1, more, fewer, and/or different components of the lift system 114 can be present without departing from the scope of the subject disclosure. For example, the system 300B can include a control circuit coupled to the laser 302 configured to, for example, control the operation of the laser 302, including power, transmission, and/or orientation control. As an additional example, the system 300B can be configured to supply the focused light beam to the interior of the inflatable member 308B via another component coupled to the detector attachment member 104, such as a conduit running alongside the body of the detector attachment member 104.

FIG. 3C illustrates another example system 300C for anomaly detection via unmanned aerial vehicle, in accordance with at least one implementation of the subject disclosure. FIG. 3C illustrates a system 300C wherein the lift system 114 of FIG. 1 includes an inflatable member 308C proximate the second end 110 of the detector attachment member 104. The inflatable member 308C can be configured to generate lift via buoyancy relative to an operating environment of the unmanned aerial vehicle 102.

In some implementations, the detector attachment member 104 has a body that is substantially hollow, as described in more detail above with reference to FIG. 1. The system 300C can also include a gas delivery system configured to supply a gas to the inflatable member 308C via the hollow body of the detector attachment member 104. For example, the system 300C can be configured to supply helium gas flow from a source external to the inflatable member 308C (e.g., from a supply coupled to the detector attachment member 104, from the unmanned aerial vehicle 102, etc.) to an interior of the inflatable member 308C via the hollow body of the detector attachment member 104. As an additional example, the system 300C can be configured to supply a gas to the inflatable member 308C via another component coupled to the detector attachment member 104, such as a conduit running alongside the body of the detector attachment member 104. In some aspects, the flow of gas into the inflatable member 308C can be regulated wholly or partially by a valve 314 coupled to the detector attachment member 104.

Although the system 300C illustrates certain components of an exemplary lift system 114 of FIG. 1, more, fewer, and/or different components of the lift system 114 can be present without departing from the scope of the subject disclosure. For example, the system 300C can include a control circuit coupled to the laser 302 configured to, for example, control the operation of the laser 302, including power, transmission, and/or orientation control.

Although FIGS. 3A-3C illustrate the systems 300A, 300B, 300C separately, some combination of the components of the systems 300A, 300B, 300C could be present within one implementation without departing from the scope of the subject disclosure. For example, the systems 300A and 300B could be combined to provide a system in which the inflatable member 308 expands as the result of heat generate by the light-absorbing region 310 of FIG. 3A, as well as by the light-absorbing region within the inflatable member 308B of FIG. 3B. As another example, the systems 300A and/or 300B, and 300C could be combined to provide a system in which the inflatable member 308 expands as a result of gas being introduced into the inflatable member 308 (e.g., as described in FIG. 3C) and heated by the system 300A, the system 300B, and/or some combination thereof.

FIG. 4A illustrates another example system 400A for anomaly detection via unmanned aerial vehicle, in accordance with at least one implementation of the subject disclosure. FIG. 4A illustrates a system 400A wherein the lift system 114 of FIG. 1 includes a motor 402 and a propulsion mechanism 404 coupled to the motor 402. In some aspects, the propulsion mechanism 404 can be a propeller or other appropriate mechanical device configured to provide force in the direction 412 once powered by the motor 402, generating lift for the components of the system 400A at a distance from the unmanned aerial vehicle 102. The motor 402 can be one or more components configured to provide energy to the propulsion mechanism 404 via a power supply circuit 410.

In some implementations, the power supply circuit 410 can be configured to receive electrical power via a photoelectric panel 406 coupled to the power supply circuit 410. The photoelectric panel 406 can be configured to generate power when exposed to a light source. In some aspects, the photoelectric panel 406 can be configured to generate power when exposed to a focused light beam from a focused light beam source such as the free space laser beam 304 from the laser 302 of FIG. 3. In further the same or alternative aspects, at least one laser 302 can be configured to provide a focused light beam with a wavelength of approximately 532 nm.

In some implementations, the lift system 114 of FIG. 1 also includes a control circuit 408 communicatively coupled to the motor 402 as well as the power supply circuit 410. The power supply circuit 410 can also, in some aspects, be configured to provide power to the control circuit 408. The control circuit 408 can be configured to provide various control functions to the motor 402, propulsion mechanism 404, and/or other components of the lift system 114.

Although the system 400A illustrates certain components of an exemplary lift system 114 of FIG. 1, more, fewer, and/or different components of the lift system 114 can be present without departing from the scope of the subject disclosure. For example, the system 400A can include a control circuit coupled to the laser 302 configured to, for example, control the operation of the laser 302, including power, transmission, and/or orientation control.

FIG. 4B illustrates another example system 400B for anomaly detection via unmanned aerial vehicle, in accordance with at least one implementation of the subject disclosure. FIG. 4B illustrates a system 400B wherein the lift system 114 of FIG. 1 includes a motor 402 and a propulsion mechanism 404 coupled to the motor 402. In some aspects, the propulsion mechanism 404 can be a propeller or other appropriate mechanical device configured to provide force in the direction 412 once powered by the motor 402, generating lift for the components of the system 400B at a distance from the unmanned aerial vehicle 102. The motor 402 can be one or more components configured to provide energy to the propulsion mechanism 404 via a power supply circuit 410.

In some implementations, the power supply circuit 410 can be configured to receive electrical power via a photoelectric panel 406 coupled to the power supply circuit 410.

The photoelectric panel 406 can be configured to generate power when exposed to a light source. In some aspects, the photoelectric panel 406 can be configured to generate power when exposed to a focused light beam. In a particular aspect, the detector attachment member 104 has a body that is substantially hollow, as described in more detail above with reference to FIG. 1. In a particular implementation, the laser 302 can be configured to generate a focused light beam through the substantially hollow body of the detector attachment member 104, as described in more detail above with reference to FIG. 3B. The focused light beam can be further manipulated within the body of the detector attachment member 104. For example, a mirror or a beam splitter 414 can be positioned proximate the second end 110 of the detector attachment member 104 in order to redirect the focused light beam to the photoelectric panel 406. The focused light beam can be, for example, a focused light beam with a wavelength of approximately 532 nm.

In some implementations, the lift system 114 of FIG. 1 also includes a control circuit 408 communicatively coupled to the motor as well as the power supply circuit 410. The power supply circuit 410 can also, in some aspects, be configured to provide power to the control circuit 408. The control circuit 408 can be configured to provide various control functions to the motor 402, propulsion mechanism 404, and/or other components of the lift system 114.

Although the system 400B illustrates certain components of an exemplary lift system 114 of FIG. 1, more, fewer, and/or different components of the lift system 114 can be present without departing from the scope of the subject disclosure. For example, the system 400B can include a control circuit coupled to the laser 302 configured to, for example, control the operation of the laser 302, including power, transmission, and/or orientation control.

Figure 5:
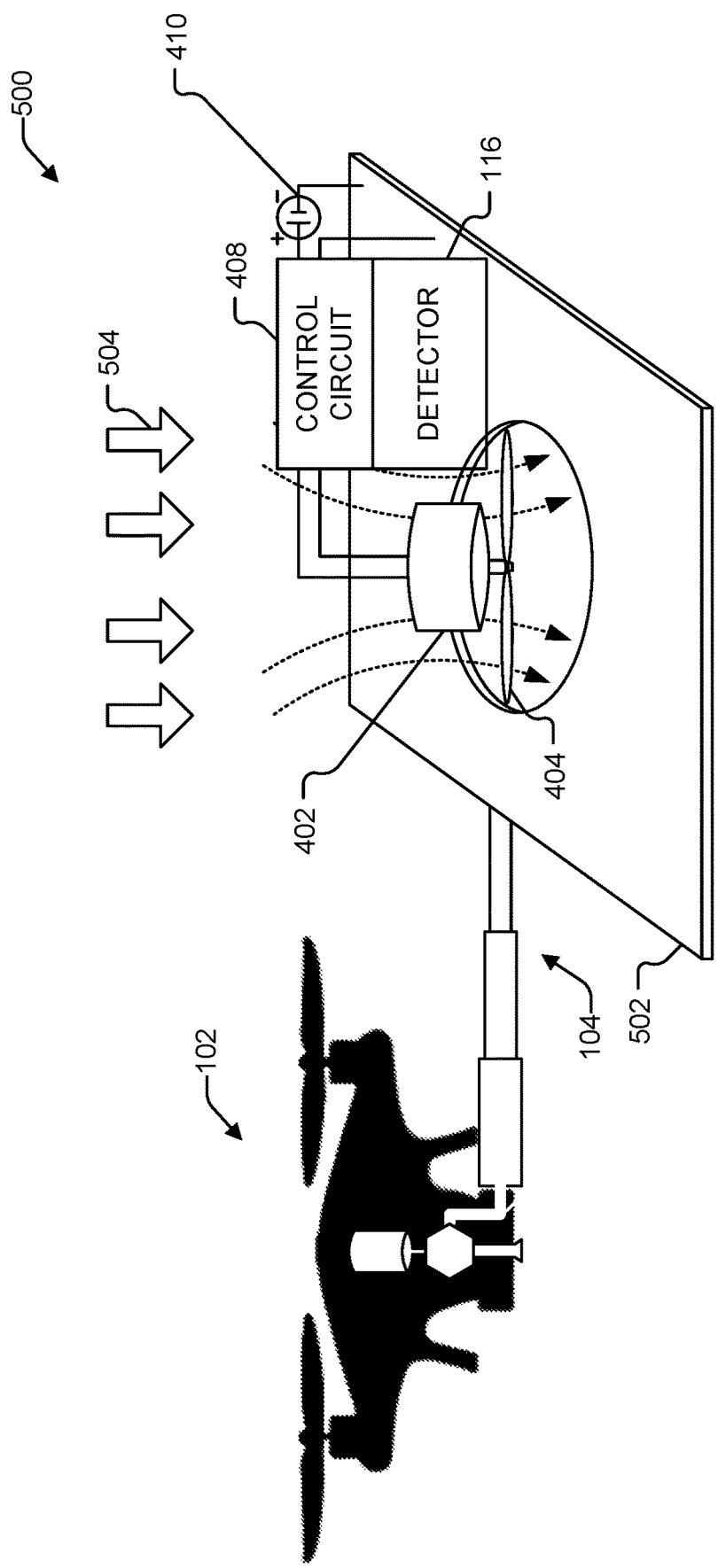
FIG. 5 illustrates another example system for anomaly detection via unmanned aerial vehicle, in accordance with at least one implementation of the subject disclosure.

FIG. 5 illustrates another example system 500 for anomaly detection via unmanned aerial vehicle, in accordance with at least one implementation of the subject disclosure. FIG. 5 illustrates a system 500 wherein the lift system 114 of FIG. 1 includes a motor 402 and a propulsion mechanism 404 coupled to the motor 402, as described in more detail above with reference to FIGS. 4A-4B. The motor 402 can be one or more components configured to provide energy to the propulsion mechanism 404. The power supply circuit 410 can be configured to receive electrical power via a solar panel 502 coupled to the power supply circuit 410. The solar panel 502 can be configured to generate power when exposed to solar radiation 504.

In some implementations, the lift system 114 of FIG. 1 also includes a control circuit 408 communicatively coupled to the motor as well as the power supply circuit 410, as described in more detail above with reference to FIGS. 4A-4B. Further, although the system 500 illustrates certain components of an exemplary lift system 114 of FIG. 1, more, fewer, and/or different components of the lift system 114 can be present without departing from the scope of the subject disclosure. For example, the system 500 may omit the air inlet/outlet system 122 and/or the air pump 120 of FIG. 1.

Figure 6:
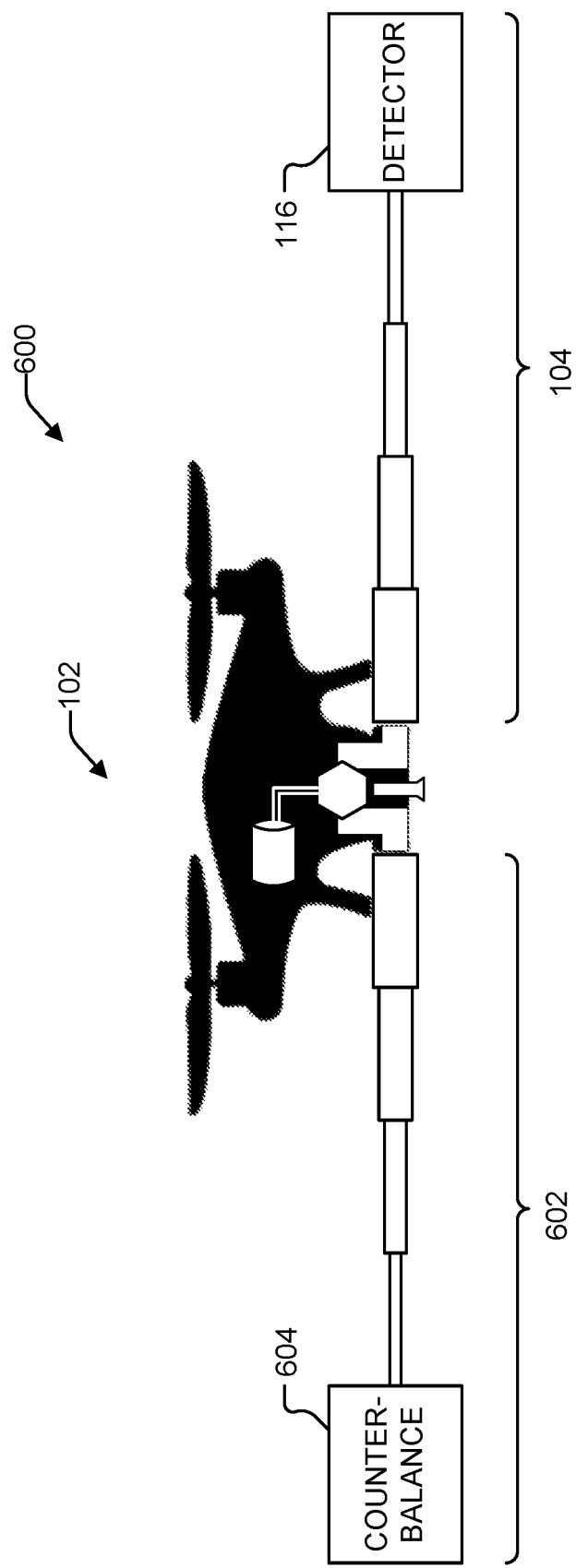
FIG. 6 illustrates another example system for anomaly detection via unmanned aerial vehicle, in accordance with at least one implementation of the subject disclosure.

FIG. 6 illustrates another example system 600 for anomaly detection via unmanned aerial vehicle, in accordance with at least one implementation of the subject disclosure. FIG. 6 illustrates a system 600 that includes a detector attachment member 104 coupled to the unmanned aerial vehicle 102 and the detector 116, as well as a counterbalance attachment member 602 coupled to the unmanned aerial vehicle 102 and a counterbalance 604.

In some implementations, the counterbalance attachment member 602 and the counterbalance 604 can be selected to be of an appropriate size (length, weight, etc.) to offset some or all of any undesirable affect the detector attachment member 104 and/or the detector 116 may have on the performance of the unmanned aerial vehicle 102. For example, the counterbalance attachment member 602 can be selected to have substantially similar dimensions (length, diameter, weight, etc.) to the detector attachment member 104, and the counterbalance 604 can be selected to have substantially similar dimensions (length, height, weight, etc.) to the detector 116. By including the counterbalance attachment member 602 and the counterbalance 604, the system 600 can be configured to provide the detector 116 coupled to the detector attachment member 104 without some or all of the need for the lift system 114 of FIG. 1.

In some aspects, the counterbalance attachment member 602 can be a second detector attachment member 104. In the same or alternative aspects, the counterbalance attachment member 602 can be any appropriate member configured to be coupled to the unmanned aerial vehicle 102 and the counterbalance 604. For example, the counterbalance attachment member 602 can be a dummy detector attachment member 104 of similar length and dimensions to the detector attachment member 104, but without some or all of the components of the lift system 114 of FIG. 1. In some aspects, the counterbalance 604 can be a second detector 116, communication system 106, and/or some combination thereof. In the same or alternative aspects, the counterbalance 604 can be any appropriately-size object of dimensions that, when combined with the counterbalance attachment member 602, allow the system 600 to offset a negative impact on the operation of the unmanned aerial vehicle 102 caused by the detector attachment member 104.

Figure 7:
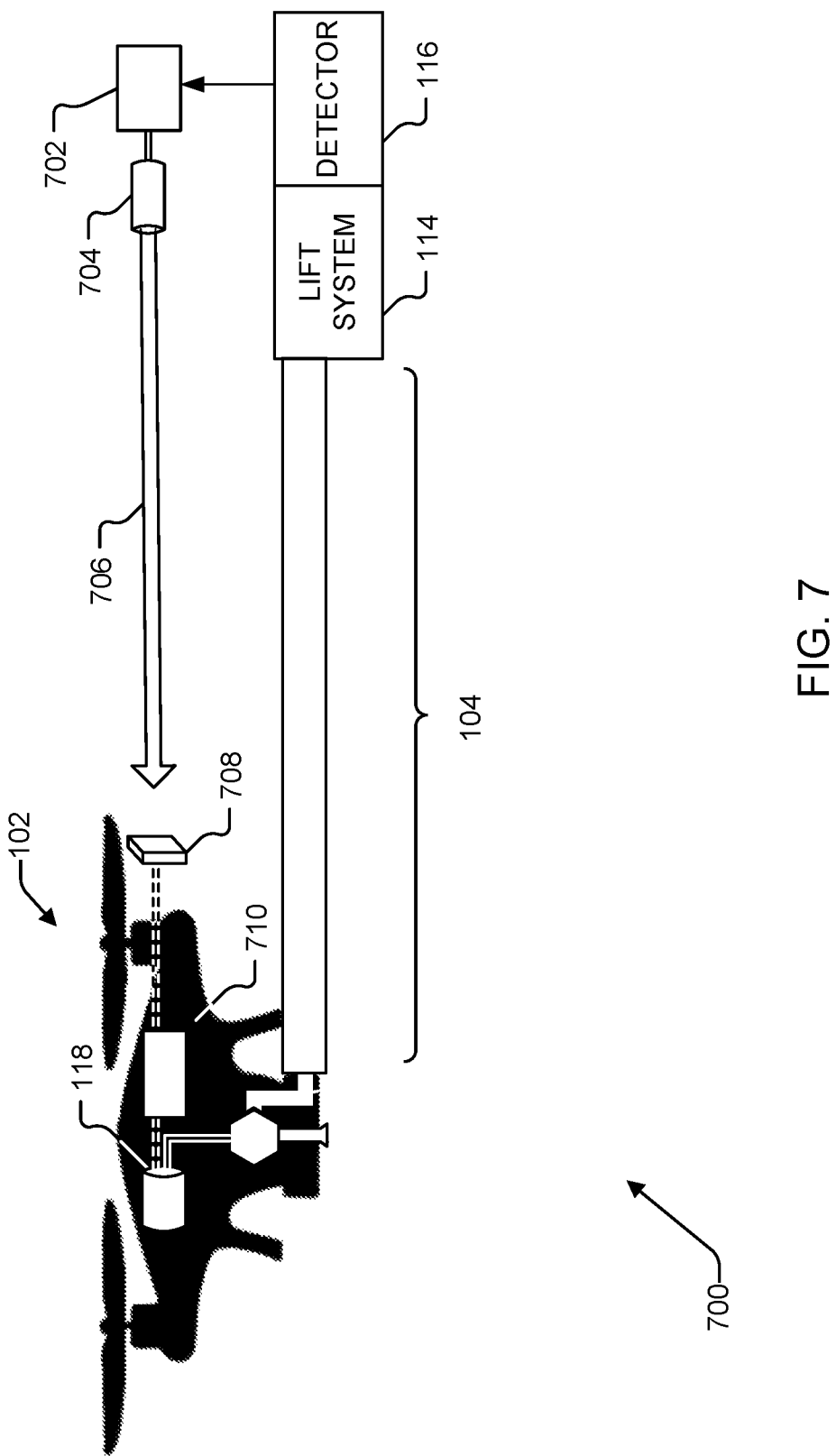
FIG. 7 illustrates another example system for anomaly detection via unmanned aerial vehicle, in accordance with at least one implementation of the subject disclosure.

FIG. 7 illustrates another example system 700 for anomaly detection via unmanned aerial vehicle, in accordance with at least one implementation of the subject disclosure. FIG. 7 illustrates a system 700 wherein the communication system 106 of FIG. 1 includes a transmitter (e.g., a control circuit 702, described in more detail below) configured to generate a wireless communication signal modulated to provide data from the detector 116. In some implementations, the transmitter can be further configured to direct the wireless communication signal to a detector (e.g., the optical detector 708 described in more detail below) onboard the unmanned aerial vehicle 102.

In some aspects, the wireless communication signal can be an optical signal. In such aspects, the system 700 can include a control circuit 702 configured to receive detector data from the detector 116 and prepare the detector data for communication to one or more components of the unmanned aerial vehicle 102. The control circuit 702 can be coupled to a laser 704 for communicating the detector data to the one or more components of the unmanned aerial vehicle 102. The laser 704 can be, for example, a laser diode configured to generate a focused light beam 706 (e.g., a free space laser beam with a wavelength of approximately 1550 nm).

In a particular aspect, the control circuit 702 can be configured to control the laser 704 according to a communications modulation scheme that enables the transfer of the detector data from the detector 116 to the unmanned aerial vehicle 102. The communication scheme can be selected to reduce one or more dimensions of the communication system 106 of the system 700. For example, a communication system that modulates the focused light beam 706 at a frequency of less than one hundred Hz can require a power level for the control circuit 702 and the laser 704 of less than one hundred microwatts. The size of the control circuit 702 and the laser 704 needed to implement such a modulation scheme is relatively small.

In addition to components at the end of the detector attachment member 104 proximate the detector 116, the communication system 106 can also include components proximate the unmanned aerial vehicle 102. For example, the communication system 106 can include one or more components configured to receive the detector data from the control circuit 702. This can include an optical detector 708 configured to detect the presence of the focused light beam 706. The communication system 106 can also include an optical receiver and a control circuit 710 configured to receive and demodulate the focused light beam received from the laser 704. The communication system 106 can also include components to process the receive detector data for further communication and/or processing by the unmanned aerial vehicle 102.

In some implementations, the laser 704 can be coupled to the unmanned aerial vehicle 102 and configured to communicate the focused light beam 706 to a reflector (e.g., a retroreflector) coupled to the control circuit 702. The reflector can, in some aspects, be configured to modulate the focused light beam 706 for communication to the optical detector 708. Such a configuration could, for example, reduce the weight at the second end 110 of the detector attachment member 104 of FIG. 1.

In some implementations, the various components of the communication system 106 present at the unmanned aerial vehicle, including the control circuit 710, can be powered in whole or in part by the power supply 118, as described in more detail above with reference to FIG. 1.

Although FIG. 7 illustrates a plurality of components implementing the communication system 106 of FIG. 1 as an optical communication system, other implementations of the communication system 106 are possible without departing from the scope of the subject disclosure. For example, the communication system 106 of FIG. 1 can be an acoustic communication system configured to communicate detector data from the detector 116 to one or more components of the unmanned aerial vehicle 102 via a modulated acoustic signal.

Further, although FIG. 7 illustrates a plurality of components implementing the communication system 106 of FIG. 1 as a wireless communication system operating over free space between the detector 116 and the unmanned aerial vehicle 102, other implementations of the communication system 106 are possible without departing from the scope of the subject disclosure. For example, the body 112 of the detector attachment member 104 can be substantially hollow. In some configurations, the transmitter can be configured to direct the wireless communication signal to the detector via the substantially hollow body 112. In a particular example, the laser 704 can be configured to direct the focused light beam 706 through the body 112 of the detector attachment member 104 to the optical detector 708 if the body 112 of the detector attachment member 104 is substantially hollow. In some configurations, this arrangement can take advantage of other components of the system 700, such as one or more beam splitters and/or waveguides, as described in more detail above with reference to FIGS. 3B, 4B.

FIG. 8 depicts another example system 800 for anomaly detection via unmanned aerial vehicle, in accordance with at least one implementation of the subject disclosure. In some implementations, the system 800 includes a computing device 802 configured to communicate with the unmanned aerial vehicle 102 of FIG. 1 via one or more vehicle control signals 812. The computing device 802 can also be configured to communicate with the communication system 106 and/or the detector attachment member 104 of FIG. 1 via one or more attachment control signals 814. The computing device 802 can be configured to deploy the detector attachment member 104 and/or communicatively couple the communication system 106 to the unmanned aerial vehicle 102 and the detector 116 of FIG. 1.

In some implementations, the computing device 802 can include one or more processors 806 coupled to a memory 808. The processor(s) 806 can be configured to deploy the detector attachment member 104. For example, the processor(s) 806 can be configured to generate one or more attachment control signals 814 for communication to the detector attachment member 104 instructing the detector attachment member 104 to extend from a first position to a second position, as described in more detail above with reference to FIGS. 2A-2B. As another example, the attachment control signals 814 can instruct the detector attachment member 104 to change positions in order to modify the position of the detector 116 of FIG. 1 relative to its environment.

In some implementations, the processor(s) 806 can be configured to communicatively couple the communication system 106 to the unmanned aerial vehicle 102 and the detector 116 of FIG. 1. For example, the processor(s) 806 can be configured to generate one or more vehicle control signals 812 and/or one or more attachment control signals 814 to communicatively couple the communication system 106 to the unmanned aerial vehicle 102 and the detector 116. In some aspects, communicatively coupling the communication system 106 to the unmanned aerial vehicle 102 can include activating one or more components of the communication system 106 present at the unmanned aerial vehicle 102. For example, as described in more detail above with reference to FIG. 7, the communication system 106 can include a control circuit 710 at the unmanned aerial vehicle 102, configured to receive and/or demodulate detector data received from the detector 116. In the same or alternative aspects, communicatively coupling the communication system 106 to the detector 116 can include activating one or more components of the communication system 106 proximate to the detector 116. For example, as described in more detail above with reference to FIG. 7, the communication system 106 can include a control circuit 702 proximate the detector 116, configured to generate a wireless communication signal for transmission to one or more components of the unmanned aerial vehicle 102.

In some implementations, the processor(s) 806 can be configured to generate one or more other control signals configured to control various components associated with the example systems 100-700 described in more detail above with reference to FIGS. 1-7. For example, the processor(s) 806 can be configured to generate one or more vehicle control signals 812 for communication to the unmanned aerial vehicle 102 of FIG. 1. The vehicle control signals 812 can include, for example, signals to instruct the unmanned aerial vehicle 102 to change positions, flight path, etc. As an additional example, the processor(s) 0806 can be configured to process data received from the detector 116 of FIG. 1.

The computing device 802 can be configured to enabled anomaly detection via unmanned aerial vehicle 102. The computing device 802 can be implemented as a stand-alone computing device and/or a component of another computing device (e.g., as an app or program running on a smart phone or laptop computer). The computing device 802 can also include components not illustrated in FIG. 8. For example, to communicate data received from the detector 116 of FIG. 1, the computing device 802 can also include one or more input/output interfaces, one or more displays, one or more network interfaces, etc.

The computing device 802 can store, at the memory 808, various data components related to, for example, the communication scheme associated with the transmission of detector data from the detector 116 of FIG. 1 to one or more components of the unmanned aerial vehicle 102, as described in more detail above with reference to FIG. 7. The memory 808 of the computing device 802 can also store more, fewer, and/or different data without departing from the scope of the subject disclosure.

Although FIG. 8 illustrates the computing device 802, the communication system 106, and the unmanned aerial vehicle 102 as separate, other configurations are possible without departing from the scope of the subject disclosure. For example, the computing device 802 and the unmanned aerial vehicle 102 can be integrated into the electronic device. As an additional example, some or all components of the communication system 106 can be integrated into the computing device 802, the unmanned aerial vehicle 102, the detector attachment member 104, and/or some combination thereof.

FIG. 9 is a flow chart of an example of a method 900 for enabling anomaly detection via unmanned aerial vehicle, in accordance with at least one implementation of the subject disclosure. The method 900 can be initiated, performed, or controlled by one or more processors executing instructions, such as by the processor(s) 806 of FIG. 8 executing instructions from the memory 808.

In some implementations, the method 900 includes, at 902, deploying a detector attachment member. For example, the processor(s) 806 of FIG. 8 can deploy the detector attachment member 104 of FIG. 1, as described in more detail above with reference to FIGS. 2A-2B and 8. In some implementations, the detector attachment member includes a first end configured to be coupled to an unmanned aerial vehicle, a second end configured to be coupled to a detector, a body extending between the first end and the second end, the body of a length selected such that an interference of the unmanned aerial vehicle at the detector is less than an interference threshold, and a lift system coupled to the body.

In the example of FIG. 9, the method 900 also includes, at 904, communicatively coupling a communication system to the unmanned aerial vehicle and the detector, wherein the communication system is coupled to the detector attachment member. For example, the processor(s) 806 of FIG. 8 can communicatively couple the communication system 106 to the unmanned aerial vehicle 102 and the detector 116 of FIG. 1, as described in more detail above with reference to FIGS. 7-8.

Although the method 900 is illustrated as including a certain number of steps, more, fewer, and/or different steps can be included in the method 900 without departing from the scope of the subject disclosure. For example, the method 900 can first communicatively couple a portion of the communication system (e.g., the portion of the communication system 106 at the unmanned aerial vehicle 102) to a computing device (e.g., the computing device 802 of FIG. 8), and then communicatively couple another portion of the communication system (e.g., the portion of the communication system 106 proximate the detector 116) to the computing device (e.g., the computing device 802 of FIG. 8).

Figure 10:
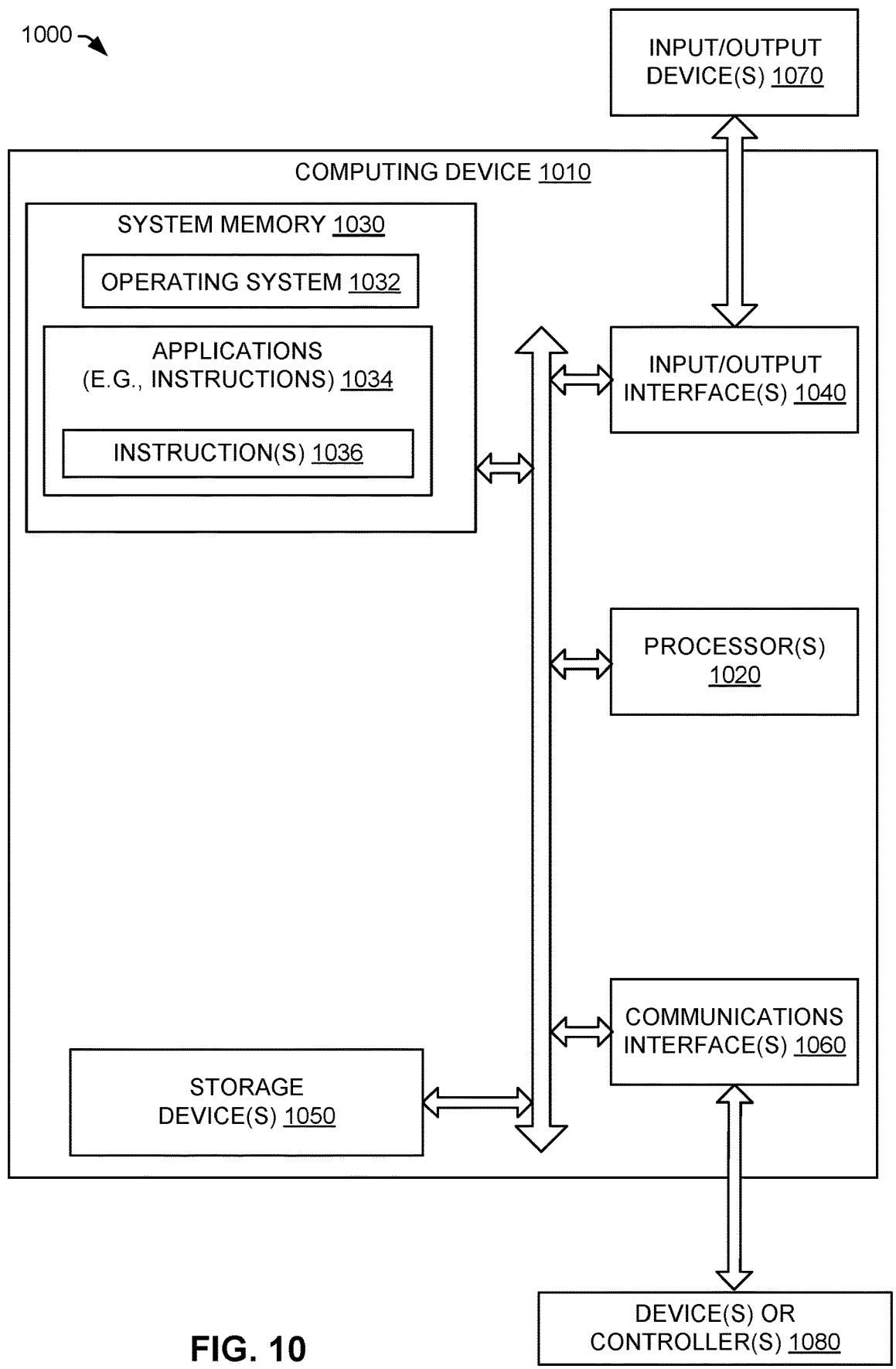
FIG. 10 is a block diagram of a computing environment including a computing device configured to support aspects of computer-implemented methods and computer-executable program instructions (or code) according to the subject disclosure.

FIG. 10 is a block diagram of a computing environment 1000 including a computing device 1010 configured to support aspects of computer-implemented methods and computer-executable program instructions (or code) according to the subject disclosure. For example, the computing device 1010, or portions thereof, is configured to execute instructions to initiate, perform, or control one or more operations described in more detail above with reference to FIGS. 1-9. In a particular aspect, the computing device 1010 can include the computing device 802 of FIG. 8; one or more servers; one or more virtual devices; or a combination thereof.

The computing device 1010 includes one or more processors 1020. In a particular aspect, the processor(s) 1020 correspond to the processor(s) 806 of FIG. 8. The processor(s) 1020 are configured to communicate with system memory 1030, one or more storage devices 1050, one or more input/output interfaces 1040, one or more communications interfaces 1060, or any combination thereof. The system memory 1030 includes volatile memory devices (e.g., random access memory (RAM) devices), nonvolatile memory devices (e.g., read-only memory (ROM) devices, programmable read-only memory, and flash memory), or both. The system memory 1030 stores an operating system 1032, which can include a basic input/output system for booting the computing device 1010 as well as a full operating system to enable the computing device 1010 to interact with users, other programs, and other devices.

The system memory 1030 includes one or more applications 1034 (e.g., sets of instructions) executable by the processor(s) 1020. As an example, the one or more applications 1034 include the instructions 1036 executable by the processor(s) 1020 to initiate, control, or perform one or more operations described with reference to FIGS. 1-9. To illustrate, the one or more applications 1034 include the instructions 1036 executable by the processor(s) 1020 to initiate, control, or perform one or more operations described with reference to deploying the detector attachment member, communicatively coupling the communication system, or a combination thereof.

In a particular implementation, the system memory 1030 includes a non-transitory, computer readable medium (e.g., a computer-readable storage device) storing the instructions 1036 that, when executed by the processor(s) 1020, cause the processor(s) 1020 to initiate, perform, or control operations for enabling anomaly detection via unmanned aerial vehicle. The operations include deploying a detector attachment member, where the detector attachment member includes a first end configured to be coupled to an unmanned aerial vehicle, a second end configured to be coupled to a detector, a body extending between the first end and the second end, the body of a length selected such that an interference of the unmanned aerial vehicle at the detector is less than an interference threshold, and a lift system coupled to the body. The operations also include communicatively coupling a communication system to the unmanned aerial vehicle and the detector, the communication system coupled to the detector attachment member.

The one or more storage devices 1050 include nonvolatile storage devices, such as magnetic disks, optical disks, or flash memory devices. In a particular example, the storage devices 1050 include both removable and non-removable memory devices. The storage devices 1050 are configured to store an operating system, images of operating systems, applications (e.g., one or more of the applications 1034), and program data. In a particular aspect, the system memory 1030, the storage devices 1050, or both, include tangible computer-readable media. In a particular aspect, one or more of the storage devices 1050 are external to the computing device 1010.

The one or more input/output interfaces 1040 enable the computing device 1010 to communicate with one or more input/output devices 1070 to facilitate user interaction. For example, the one or more input/output interfaces 1040 can include a display interface, an input interface, or both. For example, the input/output interface 1040 is adapted to receive input from a user, to receive input from another computing device, or a combination thereof. In some implementations, the input/output interface 1040 conforms to one or more standard interface protocols, including serial interfaces (e.g., universal serial bus (USB) interfaces or Institute of Electrical and Electronics Engineers (IEEE) interface standards), parallel interfaces, display adapters, audio adapters, or custom interfaces ("IEEE" is a registered trademark of The Institute of Electrical and Electronics Engineers, Inc. of Piscataway, New Jersey). In some implementations, the input/output device(s) 1070 include one or more user interface devices and displays, including some combination of buttons, keyboards, pointing devices, displays, speakers, microphones, touch screens, and other devices.

The processor(s) 1020 are configured to communicate with devices or controllers 1080 via the one or more communications interfaces 1060. For example, the one or more communications interfaces 1060 can include a network interface. The devices or controllers 1080 can include, for example, the unmanned aerial vehicle 102 of FIG. 1.

In some implementations, a non-transitory, computer readable medium (e.g., a computer-readable storage device) stores instructions that, when executed by one or more processors, cause the one or more processors to initiate, perform, or control operations to perform part of or all the functionality described above. For example, the instructions can be executable to implement one or more of the operations or methods of FIGS. 1-9. In some implementations, part or all of one or more of the operations or methods of FIGS. 1-9 can be implemented by one or more processors (e.g., one or more central processing units (CPUs), one or more graphics processing units (GPUs), one or more digital signal processors (DSPs)) executing instructions, by dedicated hardware circuitry, or any combination thereof.

The illustrations of the examples described herein are intended to provide a general understanding of the structure of the various implementations. The illustrations are not intended to serve as a complete description of all of the elements and features of apparatus and systems that utilize the structures or methods described herein. Many other implementations can be apparent to those of skill in the art upon reviewing the disclosure. Other implementations can be utilized and derived from the disclosure, such that structural and logical substitutions and changes can be made without departing from the scope of the disclosure. For example, method operations can be performed in a different order than shown in the figures or one or more method operations can be omitted. Accordingly, the disclosure and the figures are to be regarded as illustrative rather than restrictive.

Moreover, although specific examples have been illustrated and described herein, it should be appreciated that any subsequent arrangement designed to achieve the same or similar results can be substituted for the specific implementations shown. This disclosure is intended to cover any and all subsequent adaptations or variations of various implementations. Combinations of the above implementations, and other implementations not specifically described herein, will be apparent to those of skill in the art upon reviewing the description.

Further, the disclosure comprises embodiments according to the following clauses:

According to Clause 1, a system includes a detector attachment member. The detector attachment member includes a first end configured to be coupled to an unmanned aerial vehicle; a second end configured to be coupled to a detector; and a body extending between the first end and the second end, the body of a length selected such that an interference of the unmanned aerial vehicle at the detector is less than an interference threshold. The detector attachment member also includes a lift system coupled to the body. The system also includes a communication system coupled to the detector attachment member, the communication system configured to provide communication between the unmanned aerial vehicle and the detector.

Clause 2 includes the system of Clause 1, wherein the body includes a telescoping member, the telescoping member configured to extend from a first position to a second position, wherein the length is the length of the body in the second position.

Clause 3 includes the system of Clause 2, further including an extension system configured to extend the telescoping member from the first position to the second position in response to a control command.

Clause 4 includes the system of any of Clauses 1-3, wherein the body is formed of carbon fiber.

Clause 5 includes the system of any of Clauses 1-4, wherein the first end is configured to be rotationally coupled to the unmanned aerial vehicle.

Clause 6 includes the system of any of Clauses 1-5, wherein the lift system includes: an air outlet proximate the second end; an air inlet proximate the first end; and wherein the body is substantially hollow and configured to allow an air flow between the air inlet and the air outlet.

Clause 7 includes the system of Clause 6, wherein the lift system further includes a pump configured to move air from the air inlet, through the body, and to the air outlet.

Clause 8 includes the system of any of Clauses 1-7, wherein the lift system includes an inflatable member proximate the second end and configured to generate lift via buoyancy relative to an operating environment of the unmanned aerial vehicle.

Clause 9 includes the system of Clause 8, wherein the inflatable member includes a light-absorbing region configured to heat a gas within the inflatable member when exposed to a focused light beam in order to generate at least a portion of the lift.

Clause 10 includes the system of Clause 8 or Clause 9, wherein the body is substantially hollow.

Clause 11 includes the system of Clause 10, further including a gas delivery system configured to supply a gas to the inflatable member via the body.

Clause 12 includes the system of any of Clauses 1-11, wherein the lift system includes: a motor; a propulsion mechanism coupled to the motor; a control circuit communicatively coupled to the motor; and a power supply circuit, the power supply circuit coupled to provide power to the motor and the control circuit.

Clause 13 includes the system of Clause 12, further including a photoelectric panel coupled to the power supply circuit and configured to generate power when exposed to a light source.

Clause 14 includes the system of Clause 13, wherein the light source includes a focused light beam.

Clause 15 includes the system of Clause 14, wherein the focused light beam includes a laser beam with a wavelength of approximately 532 nm.

Clause 16 includes the system of Clause 14 or Clause 15, wherein: the body is substantially hollow; and the photoelectric panel is configured to receive the focused light beam via the body.

Clause 17 includes the system of Clause 13, wherein the light source includes solar radiation.

Clause 18 includes the system of any of Clauses 1-17, wherein the communication system includes a transmitter configured to generate a wireless communication signal modulated to provide data from the detector.

Clause 19 includes the system of Clause 18, wherein the wireless communication signal includes an optical signal.

Clause 20 includes the system of Clause 19, wherein the optical signal includes a laser beam with a wavelength of approximately 1550 nm.

Clause 21 includes the system of any of Clauses 18-20, wherein the wireless communication signal includes an acoustic signal.

Clause 22 includes the system of any of Clauses 18-21, wherein the transmitter is further configured to direct the wireless communication signal to a detector onboard the unmanned aerial vehicle.

Clause 23 includes the system of Clause 22, wherein: the body is substantially hollow; and the transmitter is configured to direct the wireless communication signal to the detector via the body.

Clause 24 includes the system of any of Clauses 1-23, wherein the interference threshold is based on a detection limit of the detector.

Clause 25 includes the system of any of Clauses 1-24, wherein the detector is a magnetic anomaly detector.

Clause 26 includes the system of any of Clauses 1-25, wherein the detector is an acoustic detector.

Clause 27 includes the system of any of Clauses 1-26, wherein the detector is a radiation detector.

According to Clause 28, a method includes deploying a detector attachment member, the detector attachment member including: a first end configured to be coupled to an unmanned aerial vehicle; a second end configured to be coupled to a detector; and a body extending between the first end and the second end, the body of a length selected such that an interference of the unmanned aerial vehicle at the detector is less than an interference threshold. The detector attachment member also includes a lift system coupled to the body. The method also includes communicatively coupling a communication system to the unmanned aerial vehicle and the detector, the communication system coupled to the detector attachment member.

Clause 29 includes the method of Clause 28, wherein the body includes a telescoping member, the telescoping member configured to extend from a first position to a second position, wherein the length is the length of the body in the second position.

Clause 30 includes the method of Clause 29, wherein the detector attachment member further includes an extension system configured to extend the telescoping member from the first position to the second position in response to a control command.

Clause 31 includes the method of Clause 28 or Clause 29, wherein the body is formed of carbon fiber.

Clause 32 includes the method of any of Clauses 28-31, wherein the first end is configured to be rotationally coupled to the unmanned aerial vehicle.

Clause 33 includes the method of any of Clauses 28-32, wherein the lift system includes: an air outlet proximate the second end; an air inlet proximate the first end; and wherein the body is substantially hollow and configured to allow an air flow between the air inlet and the air outlet.

Clause 34 includes the method of Clause 33, wherein the lift system further includes a pump configured to move air from the air inlet, through the body, and to the air outlet.

Clause 35 includes the method of any of Clauses 28-34, wherein the lift system includes an inflatable member proximate the second end and configured to generate lift via buoyancy relative to an operating environment of the unmanned aerial vehicle.

Clause 36 includes the method of Clause 35, wherein the inflatable member includes a light-absorbing region configured to heat a gas within the inflatable member when exposed to a focused light beam in order to generate at least a portion of the lift.

Clause 37 includes the method of Clause 35 or Clause 36, wherein the body is substantially hollow.

Clause 38 includes the method of Clause 37, wherein the detector attachment member further includes a gas delivery system configured to supply a gas to the inflatable member via the body.

Clause 39 includes the method of any of Clauses 28-38, wherein the lift system includes: a motor; a propulsion mechanism coupled to the motor; a control circuit communicatively coupled to the motor; and a power supply circuit, the power supply circuit coupled to provide power to the motor and the control circuit.

Clause 40 includes the method of Clause 39, wherein the detector attachment member further includes a photoelectric panel coupled to the power supply circuit and configured to generate power when exposed to a light source.

Clause 41 includes the method of Clause 40, wherein the light source includes a focused light beam.

Clause 42 includes the method of Clause 41, wherein the focused light beam includes a laser beam with a wavelength of approximately 532 nm.

Clause 43 includes the method of Clause 41 or Clause 42, wherein: the body is substantially hollow; and the photoelectric panel is configured to receive the focused light beam via the body.

Clause 44 includes the method of Clause 40, wherein the light source includes solar radiation.

Clause 45 includes the method of any of Clauses 28-44, wherein communicatively coupling the communication system to the unmanned aerial vehicle and the detector includes generating, in response to a control signal, a wireless communication signal at the detector for providing data from the detector to the unmanned aerial vehicle.

Clause 46 includes the method of Clause 45, wherein the wireless communication signal includes an optical signal.

Clause 47 includes the method of Clause 46, wherein the optical signal includes a laser beam with a wavelength of approximately 1550 nm.

Clause 48 includes the method of any of Clauses 45-47, wherein the wireless communication signal includes an acoustic signal.

Clause 49 includes the method of any of Clauses 45-48, wherein communicatively coupling the communication system to the unmanned aerial vehicle and the detector further includes directing, in response to a control signal, the wireless communication signal to a detector onboard the unmanned aerial vehicle.

Clause 50 includes the method of Clause 49, wherein: the body is substantially hollow; and directing the wireless communication signal includes directing the wireless communication signal to the detector via the body.

Clause 51 includes the method of any of Clauses 28-50, wherein the interference threshold is based on a detection limit of the detector.

Clause 52 includes the method of any of Clauses 28-51, wherein the detector is a magnetic anomaly detector.

Clause 53 includes the method of any of Clauses 28-52, wherein the detector is an acoustic detector.

Clause 54 includes the method of any of Clauses 28-53, wherein the detector is a radiation detector.

According to Clause 55, a non-transient, computer-readable medium stores instructions executable by one or more processors to perform certain operations. The operations include deploying a detector attachment member, the detector attachment member including: a first end configured to be coupled to an unmanned aerial vehicle; a second end configured to be coupled to a detector; and a body extending between the first end and the second end, the body of a length selected such that an interference of the unmanned aerial vehicle at the detector is less than an interference threshold. The detector attachment member also includes a lift system coupled to the body. The operations also include communicatively coupling a communication system to the unmanned aerial vehicle and the detector, the communication system coupled to the detector attachment member.

Clause 56 includes the non-transient, computer-readable medium of Clause 55, wherein the body includes a telescoping member, the telescoping member configured to extend from a first position to a second position, wherein the length is the length of the body in the second position.

Clause 57 includes the non-transient, computer-readable medium of Clause 56, wherein the detector attachment member further includes an extension system configured to extend the telescoping member from the first position to the second position in response to a control command.

Clause 58 includes the non-transient, computer-readable medium of any of Clauses 55-57, wherein the body is formed of carbon fiber.

Clause 59 includes the non-transient, computer-readable medium of any of Clauses 55-58, wherein the first end is configured to be rotationally coupled to the unmanned aerial vehicle.

Clause 60 includes the non-transient, computer-readable medium of any of Clauses 55-59, wherein the lift system includes: an air outlet proximate the second end; an air inlet proximate the first end; and wherein the body is substantially hollow and configured to allow an air flow between the air inlet and the air outlet.

Clause 61 includes the non-transient, computer-readable medium of Clause wherein the lift system further includes a pump configured to move air from the air inlet, through the body, and to the air outlet.

Clause 62 includes the non-transient, computer-readable medium of any of Clauses 55-61, wherein the lift system includes an inflatable member proximate the second end and configured to generate lift via buoyancy relative to an operating environment of the unmanned aerial vehicle.

Clause 63 includes the non-transient, computer-readable medium of Clause 62, wherein the inflatable member includes a light-absorbing region configured to heat a gas within the inflatable member when exposed to a focused light beam in order to generate at least a portion of the lift.

Clause 64 includes the non-transient, computer-readable medium of Clause 62 or Clause 63, wherein the body is substantially hollow.

Clause 65 includes the non-transient, computer-readable medium of Clause 64, wherein the detector attachment member further includes a gas delivery system configured to supply a gas to the inflatable member via the body.

Clause 66 includes the non-transient, computer-readable medium of any of Clauses 55-65, wherein the lift system includes: a motor; a propulsion mechanism coupled to the motor; a control circuit communicatively coupled to the motor; and a power supply circuit, the power supply circuit coupled to provide power to the motor and the control circuit.

Clause 67 includes the non-transient, computer-readable medium of Clause 66, wherein the detector attachment member further includes a photoelectric panel coupled to the power supply circuit and configured to generate power when exposed to a light source.

Clause 68 includes the non-transient, computer-readable medium of Clause 67, wherein the light source includes a focused light beam.

Clause 69 includes the non-transient, computer-readable medium of Clause 68, wherein the focused light beam includes a laser beam with a wavelength of approximately 532 nm.

Clause 70 includes the non-transient, computer-readable medium of Clause 68 or Clause 69, wherein: the body is substantially hollow; and the photoelectric panel is configured to receive the focused light beam via the body.

Clause 71 includes the non-transient, computer-readable medium of any of Clauses 67-70, wherein the light source includes solar radiation.

Clause 72 includes the non-transient, computer-readable medium of any of Clauses 55-71, wherein communicatively coupling the communication system to the unmanned aerial vehicle and the detector includes generating a wireless communication signal at the detector for providing data from the detector to the unmanned aerial vehicle.

Clause 73 includes the non-transient, computer-readable medium of Clause 72, wherein the wireless communication signal includes an optical signal.

Clause 74 includes the non-transient, computer-readable medium of Clause 73, wherein the optical signal includes a laser beam with a wavelength of approximately 1550 nm.

Clause 75 includes the non-transient, computer-readable medium of any of Clauses 72-74, wherein the wireless communication signal includes an acoustic signal.

Clause 76 includes the non-transient, computer-readable medium of any off Clauses 72-75, wherein communicatively coupling the communication system to the unmanned aerial vehicle and the detector further includes directing the wireless communication signal to a detector onboard the unmanned aerial vehicle.

Clause 77 includes the non-transient, computer-readable medium of Clause 76, wherein: the body is substantially hollow; and directing the wireless communication signal includes directing the wireless communication signal to the detector via the body.

Clause 78 includes the non-transient, computer-readable medium of any of Clauses 55-77, wherein the interference threshold is based on a detection limit of the detector.

Clause 79 includes the non-transient, computer-readable medium of any of Clauses 55-78, wherein the detector is a magnetic anomaly detector.

Clause 80 includes the non-transient, computer-readable medium of any of Clauses 55-79, wherein the detector is an acoustic detector.

Clause 81 includes the non-transient, computer-readable medium of any of Clauses 55-80, wherein the detector is a radiation detector.

According to Clause 82, a device includes means for deploying a detector attachment member, the detector attachment member including: a first end configured to be coupled to an unmanned aerial vehicle; a second end configured to be coupled to a detector; and a body extending between the first end and the second end, the body of a length selected such that an interference of the unmanned aerial vehicle at the detector is less than an interference threshold; a lift system coupled to the body. The device also includes means for communicatively coupling a communication system to the unmanned aerial vehicle and the detector, the communication system coupled to the detector attachment member.

Clause 83 includes the device of Clause 82, wherein the body includes a telescoping member, the telescoping member configured to extend from a first position to a second position, wherein the length is the length of the body in the second position.

Clause 84 includes the device of Clause 83, wherein the detector attachment member further includes an extension system configured to extend the telescoping member from the first position to the second position in response to a control command.

Clause 85 includes the device of any of Clauses 82-84, wherein the body is formed of carbon fiber.

Clause 86 includes the device of any of Clauses 82-85, wherein the first end is configured to be rotationally coupled to the unmanned aerial vehicle.

Clause 87 includes the device of any of Clauses 82-86, wherein the lift system includes: an air outlet proximate the second end; an air inlet proximate the first end; and wherein the body is substantially hollow and configured to allow an air flow between the air inlet and the air outlet.

Clause 88 includes the device of Clause 87, wherein the lift system further includes a pump configured to move air from the air inlet, through the body, and to the air outlet.

Clause 89 includes the device of any of Clauses 82-88, wherein the lift system includes an inflatable member proximate the second end and configured to generate lift via buoyancy relative to an operating environment of the unmanned aerial vehicle.

Clause 90 includes the device of Clause 89, wherein the inflatable member includes a light-absorbing region configured to heat a gas within the inflatable member when exposed to a focused light beam in order to generate at least a portion of the lift.

Clause 91 includes the device of Clause 89 or Clause 90, wherein the body is substantially hollow.

Clause 92 includes the device of Clause 91, wherein the detector attachment member further includes a gas delivery system configured to supply a gas to the inflatable member via the body.

Clause 93 includes the device of any of Clauses 82-92, wherein the lift system includes: a motor; a propulsion mechanism coupled to the motor; a control circuit communicatively coupled to the motor; and a power supply circuit, the power supply circuit coupled to provide power to the motor and the control circuit.

Clause 94 includes the device of Clause 93, wherein the detector attachment member further includes a photoelectric panel coupled to the power supply circuit and configured to generate power when exposed to a light source.

Clause 95 includes the device of Clause 94, wherein the light source includes a focused light beam.

Clause 96 includes the device of Clause 95, wherein the focused light beam includes a laser beam with a wavelength of approximately 532 nm.

Clause 97 includes the device of Clause 95 or Clause 96, wherein: the body is substantially hollow; and the photoelectric panel is configured to receive the focused light beam via the body.

Clause 98 includes the device of Clause 94, wherein the light source includes solar radiation.

Clause 99 includes the device of any of Clauses 82-98, wherein the means for communicatively coupling the communication system to the unmanned aerial vehicle and the detector includes means for generating a wireless communication signal at the detector for providing data from the detector to the unmanned aerial vehicle.

Clause 100 includes the device of Clause 99, wherein the wireless communication signal includes an optical signal.

Clause 101 includes the device of Clause 100, wherein the optical signal includes a laser beam with a wavelength of approximately 1550 nm.

Clause 102 includes the device of any of Clauses 99-101, wherein the wireless communication signal includes an acoustic signal.

Clause 103 includes the device of any of Clauses 99-102, wherein the means for communicatively coupling the communication system to the unmanned aerial vehicle and the detector further includes means for directing the wireless communication signal to a detector onboard the unmanned aerial vehicle.

Clause 104 includes the device of Clause 103, wherein: the body is substantially hollow; and directing the wireless communication signal includes directing the wireless communication signal to the detector via the body.

Clause 105 includes the device of any of Clauses 82-104, wherein the interference threshold is based on a detection limit of the detector.

Clause 106 includes the device of any of Clauses 82-105, wherein the detector is a magnetic anomaly detector.

Clause 107 includes the device of any of Clauses 82-106, wherein the detector is an acoustic detector.

Clause 108 includes the device of any of Clauses 82-107, wherein the detector is a radiation detector.

The Abstract of the Disclosure is submitted with the understanding that it will not be used to interpret or limit the scope or meaning of the claims. In addition, in the foregoing Detailed Description, various features can be grouped together or described in a single implementation for the purpose of streamlining the disclosure. Examples described above illustrate but do not limit the disclosure. It should also be understood that numerous modifications and variations are possible in accordance with the principles of the subject disclosure. As the following claims reflect, the claimed subject matter can be directed to less than all of the features of any of the disclosed examples. Accordingly, the scope of the disclosure is defined by the following claims and their equivalents

What is claimed is:
1. A system comprising:
 a detector attachment member comprising:
  a first end configured to be coupled to an unmanned aerial vehicle;
  a second end configured to be coupled to a detector;
  a body extending between the first end and the second end, the body of a length selected such that an interference of the unmanned aerial vehicle at the detector is less than an interference threshold;

a lift system coupled to the body, wherein:
the lift system comprises an inflatable member proximate the second end and configured to generate lift via buoyancy relative to an operating environment of the unmanned aerial vehicle; and
the inflatable member comprises a light-absorbing region configured to heat a gas within the inflatable member when exposed to a focused light beam in order to generate at least a portion of the lift; and
a communication system coupled to the detector attachment member, the communication system configured to provide communication between the unmanned aerial vehicle and the detector.

2. The system of claim 1, wherein the body comprises a telescoping member, the telescoping member configured to extend from a first position to a second position, wherein the length is the length of the body in the second position.

3. The system of claim 2, further comprising an extension system configured to extend the telescoping member from the first position to the second position in response to a control command.

4. The system of claim 1, wherein the first end is configured to be rotationally coupled to the unmanned aerial vehicle.

5. The system of claim 1, wherein the lift system further comprises:
an air outlet proximate the second end;
an air inlet proximate the first end; and
wherein the body is substantially hollow and configured to allow an air flow between the air inlet and the air outlet.

6. A system comprising:
a detector attachment member comprising:
a first end configured to be coupled to an unmanned aerial vehicle;
a second end configured to be coupled to a detector;
a body extending between the first end and the second end, the body of a length selected such that an interference of the unmanned aerial vehicle at the detector is less than an interference threshold;
a lift system coupled to the body, wherein:
the lift system comprises an inflatable member proximate the second end and configured to generate lift via buoyancy relative to an operating environment of the unmanned aerial vehicle;
the body is substantially hollow; and
the lift system further comprises a gas delivery system configured to supply a gas to the inflatable member via the body; and
a communication system coupled to the detector attachment member, the communication system configured to provide communication between the unmanned aerial vehicle and the detector.

7. The system of claim 1, wherein the lift system comprises:
a motor;
a propulsion mechanism coupled to the motor;
a control circuit communicatively coupled to the motor; and
a power supply circuit, the power supply circuit coupled to provide power to the motor and the control circuit.

8. The system of claim 7, further comprising a photoelectric panel coupled to the power supply circuit and configured to generate power when exposed to a light source.

9. The system of claim 8, wherein the light source comprises a focused light beam.

10. The system of claim 9, wherein:
the body is substantially hollow; and
the photoelectric panel is configured to receive the focused light beam via the body.

11. The system of claim 8, wherein the light source comprises solar radiation.

12. The system of claim 1, wherein the communication system comprises a transmitter configured to generate a wireless communication signal modulated to provide data from the detector.

13. The system of claim 1, wherein the interference threshold is based on a detection limit of the detector.

14. The system of claim 1, wherein the detector is a magnetic anomaly detector, an acoustic detector, or a radiation detector.

15. A method comprising:
deploying a detector attachment member, the detector attachment member comprising:
a first end configured to be coupled to an unmanned aerial vehicle;
a second end configured to be coupled to a detector;
a body extending between the first end and the second end, the body of a length selected such that an interference of the unmanned aerial vehicle at the detector is less than an interference threshold;
a lift system coupled to the body, wherein:
the lift system comprises an inflatable member proximate the second end and configured to generate lift via buoyancy relative to an operating environment of the unmanned aerial vehicle; and
the inflatable member comprises a light-absorbing region configured to heat a gas within the inflatable member when exposed to a focused light beam in order to generate at least a portion of the lift; and
communicatively coupling a communication system to the unmanned aerial vehicle and the detector, the communication system coupled to the detector attachment member.

16. The method of claim 15, wherein communicatively coupling the communication system to the unmanned aerial vehicle and the detector comprises generating, in response to a control signal, a wireless communication signal at the detector for providing data from the detector to the unmanned aerial vehicle.

17. The method of claim 16, wherein the wireless communication signal comprises an optical signal or an acoustic signal.

18. A non-transient, computer-readable medium storing instructions executable by one or more processors to perform operations comprising:
deploying a detector attachment member, the detector attachment member comprising:
a first end configured to be coupled to an unmanned aerial vehicle;
a second end configured to be coupled to a detector;
a body extending between the first end and the second end, the body of a length selected such that an interference of the unmanned aerial vehicle at the detector is less than an interference threshold;
a lift system coupled to the body, wherein:
the lift system comprises an inflatable member proximate the second end and configured to generate lift via buoyancy relative to an operating environment of the unmanned aerial vehicle; and
the inflatable member comprises a light-absorbing region configured to heat a gas within the inflatable member when exposed to a focused light beam in order to generate at least a portion of the lift; and communicatively coupling a communication system to the unmanned aerial vehicle and the detector, the communication system coupled to the detector attachment member.

19. A system comprising:

a detector attachment member comprising:
- a first end configured to be coupled to an unmanned aerial vehicle;
- a second end configured to be coupled to a detector;
- a body extending between the first end and the second end, the body of a length selected such that an interference of the unmanned aerial vehicle at the detector is less than an interference threshold;
- a lift system coupled to the body, wherein the lift system comprises:
  - a motor;
  - a propulsion mechanism coupled to the motor;
  - a control circuit communicatively coupled to the motor; and
  - a power supply circuit, the power supply circuit coupled to provide power to the motor and the control circuit;
- a photoelectric panel coupled to the power supply circuit and configured to generate power when exposed to a light source, wherein the light source comprises a focused light beam; and
- a communication system coupled to the detector attachment member, the communication system configured to provide communication between the unmanned aerial vehicle and the detector.

20. The system of claim 19, wherein:

the body is substantially hollow; and the photoelectric panel is configured to receive the focused light beam via the body.

* * * * *